US 12,530,789 B2

(12) United States Patent
Chen et al.

(10) Patent No.: US 12,530,789 B2
(45) Date of Patent: *Jan. 20, 2026

(54) MACHINE LEARNING-BASED 2D STRUCTURED IMAGE GENERATION

(71) Applicant: Blizzard Entertainment, Inc., Irvine, CA (US)

(72) Inventors: Shuo Chen, Trabuco Canyon, CA (US); Denis Rogic, Irvine, CA (US)

(73) Assignee: Blizzard Entertainment, Inc., Irvine, CA (US)

( * ) Notice: Subject to any disclaimer, the term of this patent is extended or adjusted under 35 U.S.C. 154(b) by 493 days.

This patent is subject to a terminal disclaimer.

(21) Appl. No.: 18/087,809

(22) Filed: Dec. 23, 2022

(65) Prior Publication Data

US 2023/0126800 A1  Apr. 27, 2023

Related U.S. Application Data

(63) Continuation of application No. 17/176,740, filed on Feb. 16, 2021, now Pat. No. 11,538,178.

(Continued)

(51) Int. Cl.
*G06T 7/529* (2017.01)
*G06T 5/50* (2006.01)
(Continued)

(52) U.S. Cl.
CPC .......... *G06T 7/529* (2017.01); *G06T 5/50* (2013.01); *G06T 11/001* (2013.01); *G06V 10/25* (2022.01); *G06T 2207/20081* (2013.01)

(58) Field of Classification Search
CPC ......... G06T 7/529; G06T 5/50; G06T 11/001; G06T 11/00; G06V 10/25; G06V 10/82; G06F 18/24323
See application file for complete search history.

(56) References Cited

U.S. PATENT DOCUMENTS

2019/0188534 A1* 6/2019 Murrish ............ G06N 3/08
2020/0082249 A1* 3/2020 Hua ................. G06N 3/045
(Continued)

OTHER PUBLICATIONS

Simonyan et al., "Very Deep Convolutional Networks for Large-Scale Image Recognition", Published as a conference paper at ICLR 2015, dated Apr. 10, 2015, 14 pages.

(Continued)

*Primary Examiner* — Stephen R Koziol
*Assistant Examiner* — Michael Kim Maiden
(74) *Attorney, Agent, or Firm* — Ray Quinney & Nebeker P.C.; John O. Carpenter

(57) ABSTRACT

Techniques are described for a multiple-phase process that uses machine learning (ML) models to produce a texturized version of an input image. During a first phase, using a pix2pix-based ML model, an automatically-generated image that depicts structured texture is generated based on an input image that visually identifies a plurality of image areas for the structured texture. During a second phase, a neural style transfer-based ML model is used to apply the style of a style image (e.g., a target image from the training dataset of the pix2pix-based ML model) to the texture image generated at the first phase (the content image) to produce a modified texture image. According to an embodiment, during a third phase, the generated texture image produced at the first phase and the modified texture image produced at the second phase are combined to produce a structured texture image with a moderated amount of detail.

20 Claims, 18 Drawing Sheets

Related U.S. Application Data

(60) Provisional application No. 63/129,453, filed on Dec. 22, 2020.

(51) Int. Cl.
*G06T 11/00* (2006.01)
*G06V 10/25* (2022.01)

(56) References Cited

U.S. PATENT DOCUMENTS

2021/0312634 A1* 10/2021 Plawinski ............... G06T 11/60
2022/0198691 A1    6/2022 Chen et al.

OTHER PUBLICATIONS

Ronneberger et al., "U-Net: Convolutional Networks for Biomedical Image Segmentation", dated May 18, 2015, 8 pages.
Mirza et al., "Conditional Generative Adversarial Nets", dated Nov. 6, 2014, 7 pages.
Krizhevsky et al., "ImageNet Classification with Deep Convolutional Neural Networks", NIPS dated 2012, 9 pages.
Isola et al., "Image-to-Image Translation with Conditional Adversarial Networks", dated Nov. 26, 2018, 17 pages.
Huang et al., "Arbitrary Style Transfer in Real-time with Adaptive Instance Normalization", dated Jul. 30, 2017, 11 pages.
https://github.com/phillipi/pix2pix, "Image-to-image Translation with Conditional Adversarial Nets" last updated Aug. 4, 2020, 8 pages.
Hesse, Christopher, "Image-toImage Translation in Tensorflow", dated Jan. 25, 2017, 11 pages.
He et al., "Deep Residual Learning for Image Recognition", dated Dec. 10, 2015, 12 pages.
Github-mdbloice, "Image augmentation library in Python for machine learning", https://github.com/mdbloice/Augmentor, updated Mar. 9, 2020, 22 pages.
Gatys et al., "A Neural Algorithm of Artistic Style", dated Sep. 2, 2015, 16 pages.
Ganegedara, Thushan, "Intuitive Guide to Neural Style Transfer", dated Jan. 8, 2019, 13 pages.
Finlayson et al., "The Alternating Least Squares Technique for Nonuniform Intensity Color Correction", dated 2014 The Authors Color Research & Application Published by Wiley Periodicals, 11 pages.
Based on pix2pix by Isola et al., "Tensorflow port of Image-to-Image Translation with Conditional Adversarial Nets", dated Dec. 30, 2017, 11 pages.

* cited by examiner

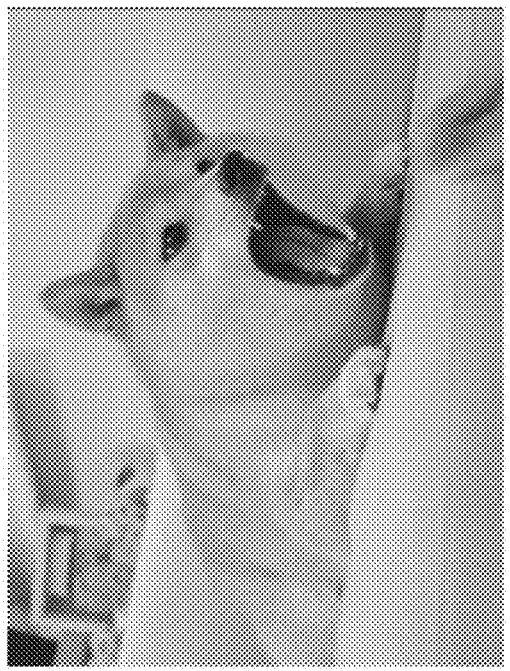
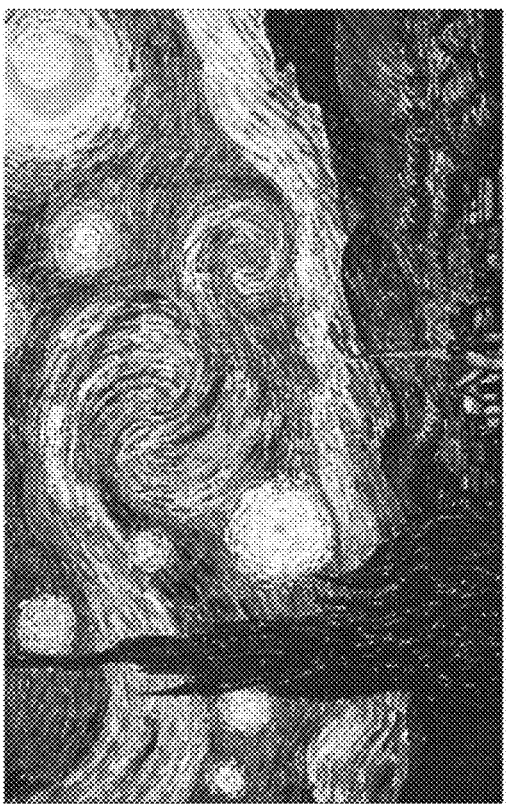
FIG. 1

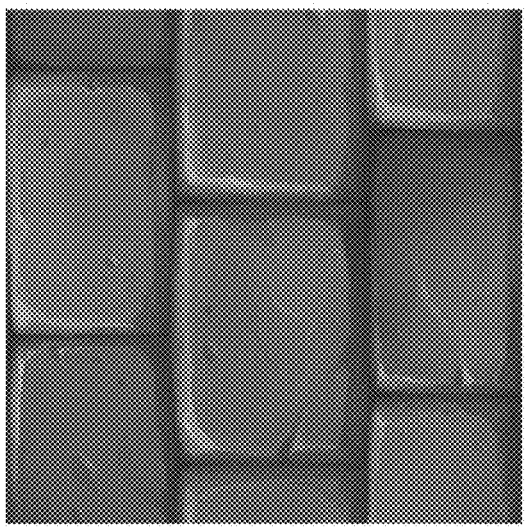
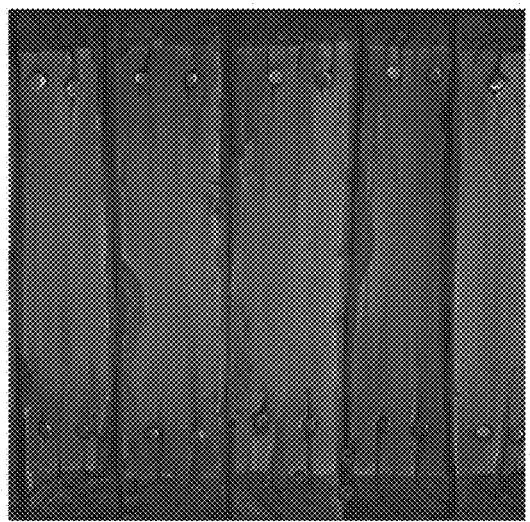
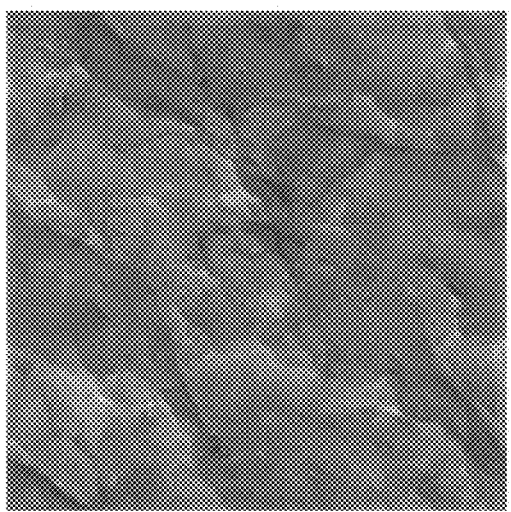
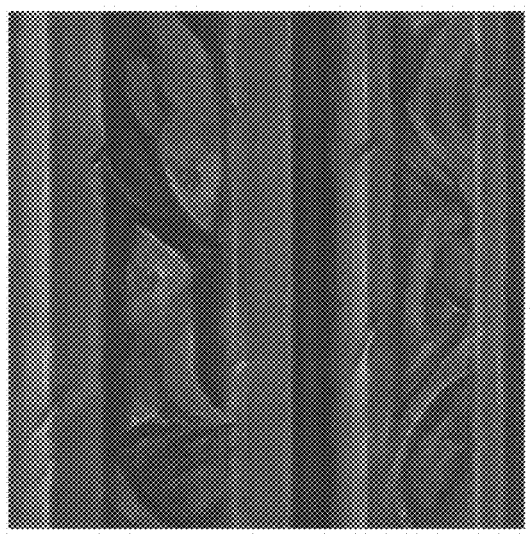
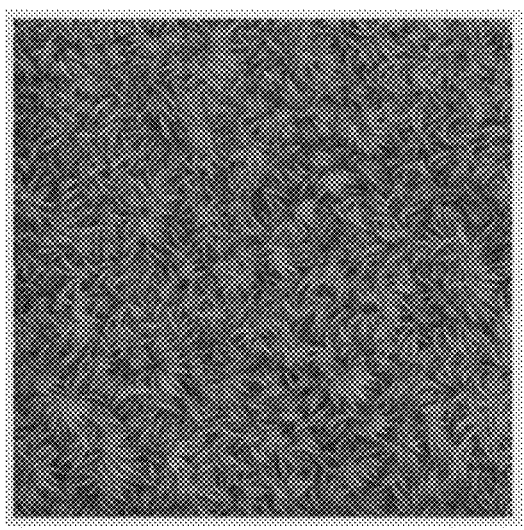
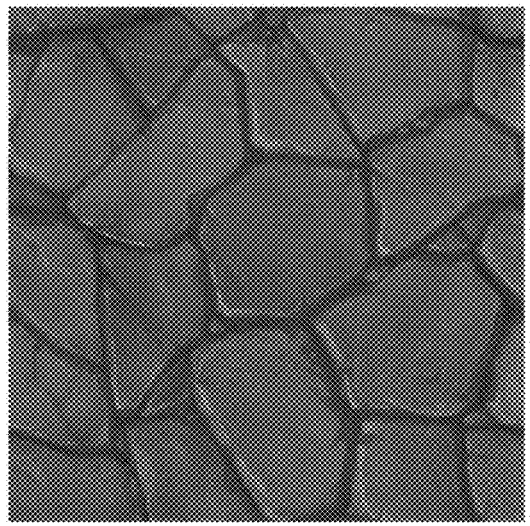
FIG. 3

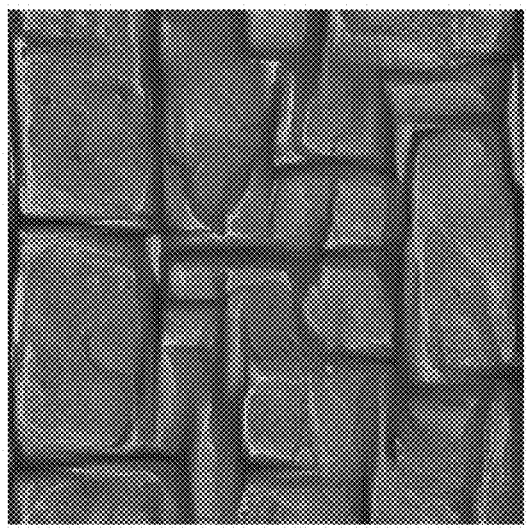
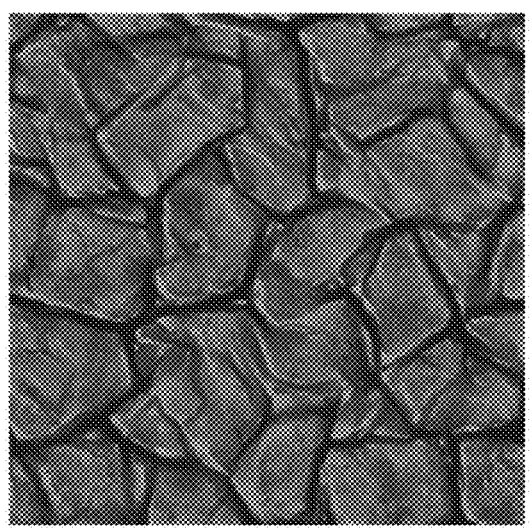
NST (+ NOISE CONTENT)
NST (+ NOISE CONTENT)
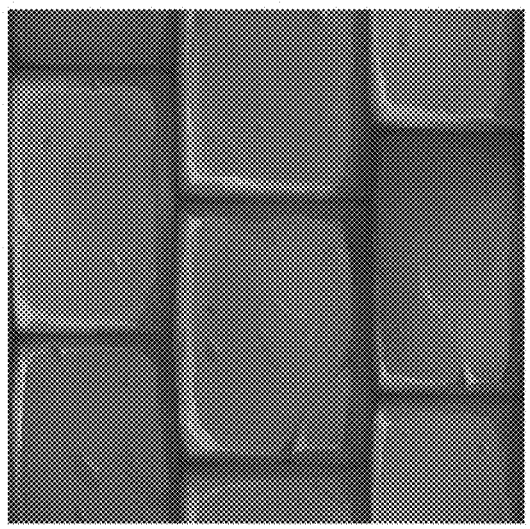
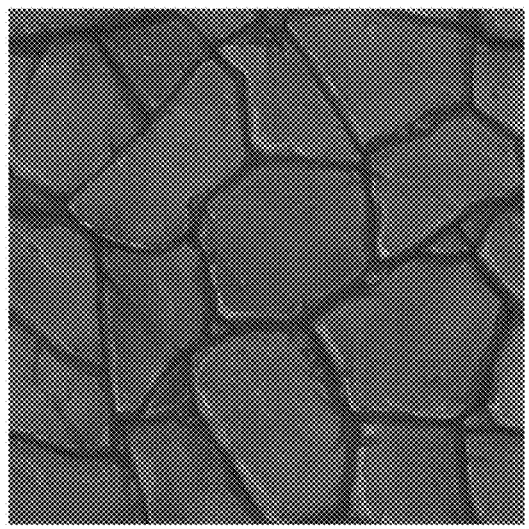
FIG. 6

902 USING A TRAINING DATASET, TRAINING A CONDITIONAL GENERATIVE ADVERSARIAL NETWORK MACHINE LEARNING MODEL TO PRODUCE A FIRST TRAINED MACHINE LEARNING MODEL, WHERE THE TRAINING DATASET COMPRISES A PLURALITY OF PAIRS OF IMAGES, WHEREIN EACH PAIR OF IMAGES, OF THE PLURALITY OF PAIRS OF IMAGES, COMPRISES AN INPUT IMAGE THAT VISUALLY DEFINES A PLURALITY OF DISTINCT IMAGE AREAS AND A TARGET IMAGE THAT DEPICTS A TEXTURIZED VERSION OF EACH DISTINCT IMAGE AREA OF THE PLURALITY OF DISTINCT IMAGE AREAS

904 RECEIVING A REQUEST TO TEXTURIZE A PARTICULAR INPUT IMAGE THAT VISUALLY DEFINES A PARTICULAR PLURALITY OF DISTINCT IMAGE AREAS

906 PERFORMING A MULTIPLE-PHASE OPERATION TO PRODUCE A STYLED TEXTURIZED OUTPUT IMAGE BASED ON THE PARTICULAR INPUT IMAGE

908 DURING A FIRST PHASE OF THE MULTIPLE-PHASE OPERATION: BASED ON THE PARTICULAR INPUT IMAGE, USING THE FIRST TRAINED MACHINE LEARNING MODEL TO INFER A TEXTURED OUTPUT IMAGE THAT DEPICTS AN AUTOMATICALLY-GENERATED TEXTURE FOR EACH DISTINCT IMAGE AREA OF THE PARTICULAR PLURALITY OF DISTINCT IMAGE AREAS

910 DURING A SECOND PHASE OF THE MULTIPLE-PHASE OPERATION: BASED ON (A) THE TEXTURED OUTPUT IMAGE PRODUCED DURING THE FIRST PHASE OF THE MULTI-PHASE OPERATION AND (B) A STYLE INPUT IMAGE, USING A SECOND TRAINED MACHINE LEARNING MODEL CONFIGURED TO PERFORM NEURAL STYLE TRANSFER TO INFER THE STYLED TEXTURIZED OUTPUT IMAGE THAT INCORPORATES CONTENT OF THE TEXTURED OUTPUT IMAGE AND REFLECTS ONE OR MORE STYLE ASPECTS OF THE STYLE INPUT IMAGE

912 RETURNING, AS A RESPONSE TO THE REQUEST, THE STYLED TEXTURIZED OUTPUT IMAGE

FIG. 9

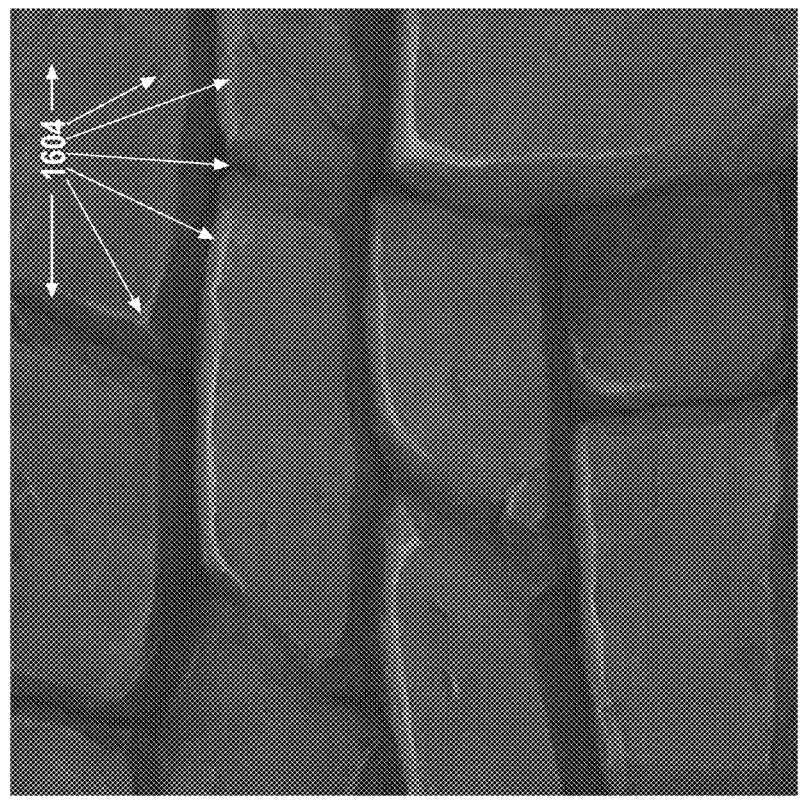
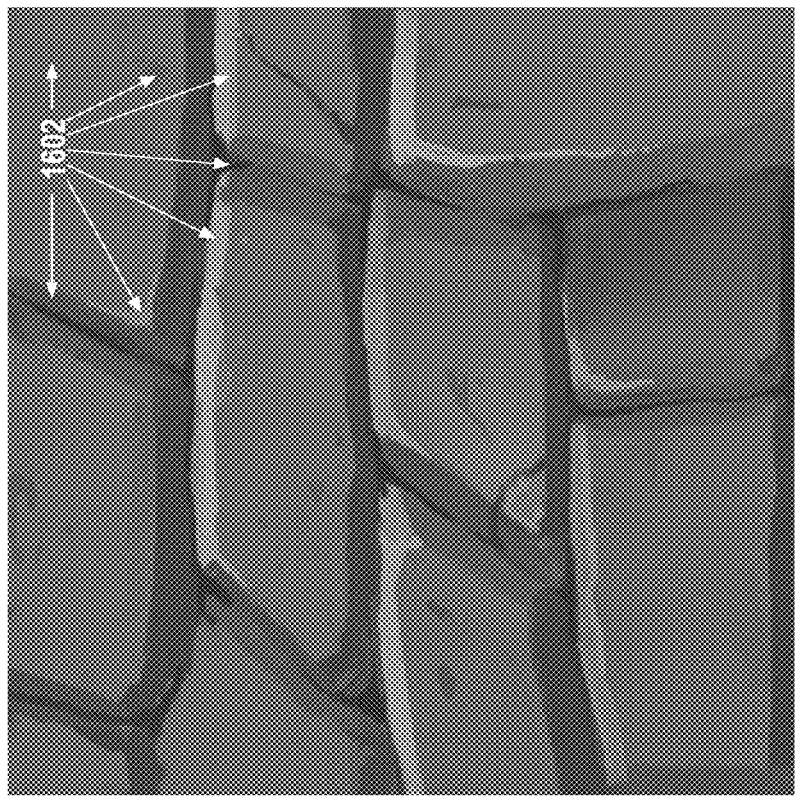
FIG. 16

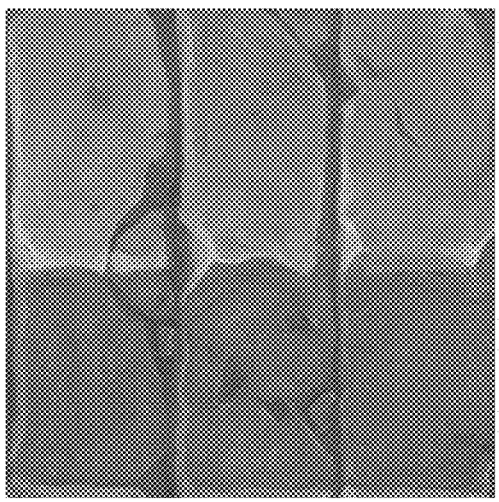
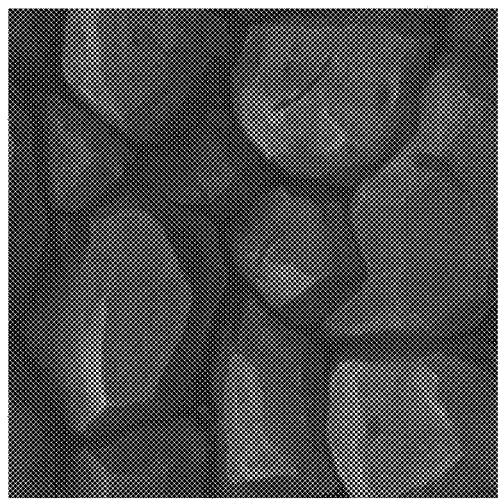
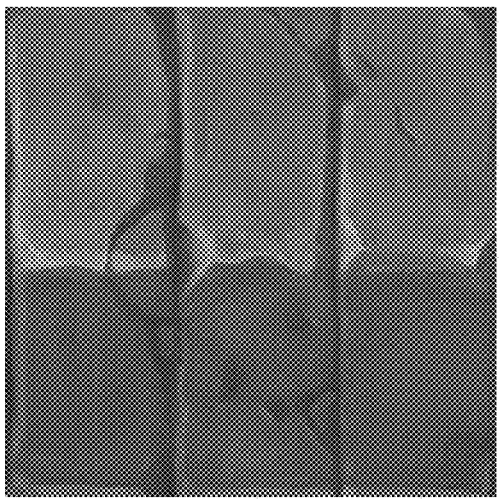
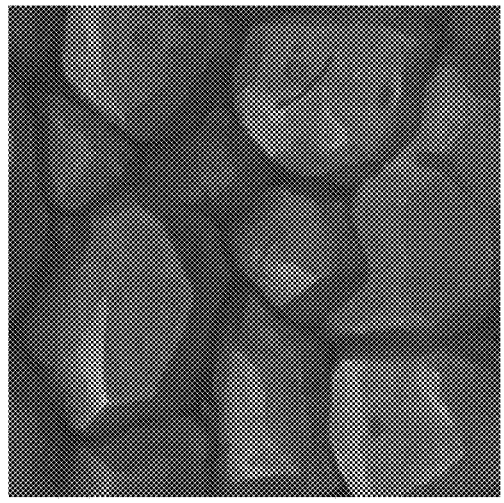
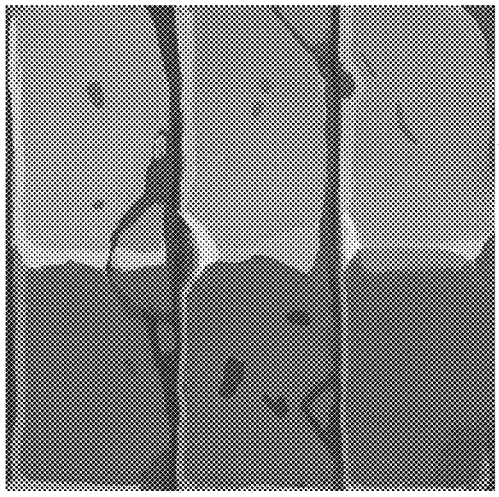
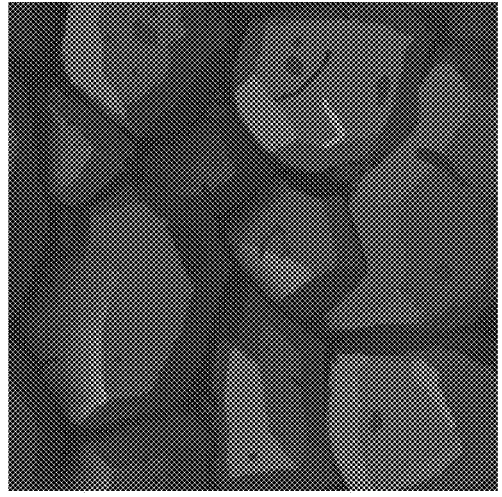
FIG. 17

MACHINE LEARNING-BASED 2D STRUCTURED IMAGE GENERATION

BENEFIT CLAIM

This application claims the benefit as a continuation of application Ser. No. 17/176,740, filed Feb. 16, 2021, by Shuo Chen et al., which claims the benefit as a Provisional Application No. 63/129,453, filed Dec. 22, 2020, the entire content of which is hereby incorporated by reference as if fully set forth herein, under 35 U.S.C. § 119(e).

FIELD OF THE INVENTION

The present disclosure relates to using machine learning to automatically generate 2D images and, more specifically, to automatically generating structured texture images using machine learning with a reduced requirement for training data.

BACKGROUND

Art-based products, such as video games, animated movies, and other products, require large quantities of high-quality artwork in order to be marketable. For example, art-based products that are in a hand-painted style include particularly high-quality artwork, which require highly-skilled and trained artists a significant amount of time to produce. As an art-based product becomes more intricate, the scope of the required artwork rapidly increases. This problem of scope is exacerbated when it comes to interactive media, such as video games, where high-quality artwork is required to flesh out interactive digital worlds, and the quality of artwork is directly related to marketability of the interactive media-based product. Many times, these art-based products are subject to release deadlines, and it can be difficult for a team of artists to produce all of the artwork required to meet such deadlines.

There has been some research into machine-learning based tools to aid in generating artwork. For example, as depicted in FIG. 1, neural style transfer is a machine learning technique able to transfer style elements from a style image 102 to a content image 104 to produce a stylized output image 106. (For additional information regarding neural style transfer, see "A Neural Algorithm of Artistic Style," by Leon A. Gatys, et al., 2 Sep. 2015, the entire contents of which is incorporated by reference as if fully set forth herein.) However, it can be difficult to apply neural style transfer to produce artwork that is of the nature needed for a given product and that is up to the high standards that are required to maintain the marketability of the product.

As another example, pix2pix is a technique performs image-to-image translation. FIG. 2 depicts examples of image-to-image translation performed using the pix2pix technique, i.e., automatic generation of a building façade output image 204 based on a color block input image 202, and automatic generation of a purse output image 214 based on a line drawing input image 212. (For additional information regarding the pix2pix technique, see "Image-to-image translation with conditional adversarial networks" by Isola, Phillip, et al., 2017, the entire contents of which is incorporated by reference as if fully set forth herein.) The particular image translation capability and quality of output images from such a model is dependent on the size and variety of images in a training dataset on which the model is trained. However, it can be very difficult and expensive to generate a large training dataset sufficient to automatically generate high-quality images using the pix2pix technique.

Thus, there is a need for a system that aids artists in increasing the volume of high-quality artwork that they can produce without requiring production of large quantities of data for machine learning training datasets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts using the neural style transfer machine learning technique to transfer style elements from a style image to a content image to produce a stylized output image.

FIG. 3 depicts example texture images.

FIG. 6 depicts application of neural style transfer to infer automatically-generated images of structured textures.

FIG. 9 depicts a flowchart for a multiple-phase process of using machine learning models to produce a texturized version of an input image.

FIG. 16 depicts a plurality of color blocks in a color block-style input image and a plurality of corresponding textured image areas in a corresponding target image.

FIG. 17 depicts colorizing an automatically-generated image based on colors in a color block-style input image based on which the automatically-generated image was generated.

DETAILED DESCRIPTION

Figure 2:
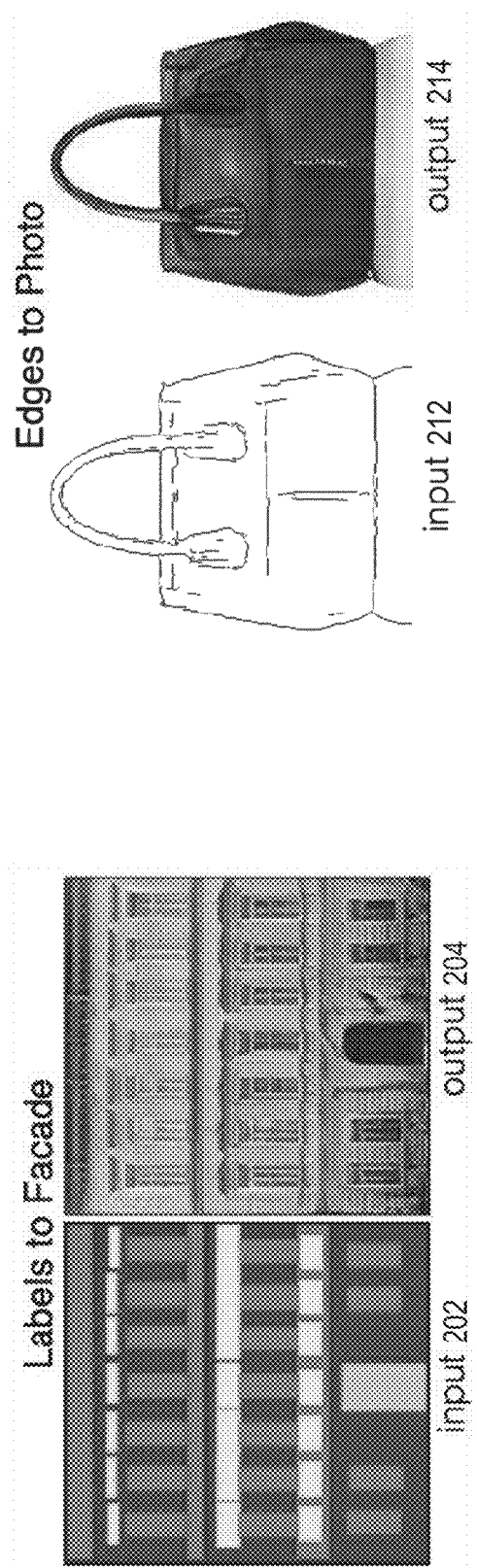
FIG. 2 depicts examples of image-to-image translation performed using the pix2pix machine learning technique.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Also, diagrams with reference numbers in common refer to a common entity.

General Overview

In an art-based product, such as a video game, there are classes of artwork (including environment texture art) that are time-intensive and expensive to produce, but that require limited creative input from an artist. Techniques described herein comprise a multiple-phase process that uses machine learning (ML) models to produce a texturized version of an input image.

Specifically, during a first phase, an automatically-generated image that depicts structured texture (such as brick, cobblestone, wood, etc.) is generated using a pix2pix-based ML model. The input image used to produce the automatically-generated image visually identifies a plurality of image areas for the structured texture. A limited amount of training data is required to train the pix2pix-based ML model. However, a pix2pix-based ML model that is trained on a limited amount of training data produces a generated texture image that is lacking in detail.

During a second phase, a neural style transfer-based ML model is used to apply the style of a style image (e.g., a target image from the training dataset of the pix2pix-based ML model) to the texture image generated at the first phase (the content image) to produce a modified automatically-generated texture image. Utilizing neural style transfer to apply details from a detailed style image increases the amount of detail in the modified automatically-generated texture image, which mitigates the effects of limited training data for the pix2pix-based ML model.

According to an embodiment, during a third phase of the multiple-phase process, the generated texture image produced at the first phase (less detailed) and the modified automatically-generated texture image produced at the second phase (highly detailed) are combined to produce a structured texture image with a more moderate amount of detail. This third phase allows a user to control the amount of detail that is included in the generated texture image.

By using this multiple phase technique, less training data for the pix2pix-based ML model is required in order to automatically produce detailed images of structured texture. The reduction in training data reduces the amount of time it takes to train the pix2pix-based ML model, where the training phase of a model is the most time- and resource-intensive requirement of machine learning.

Furthermore, because application of a trained ML model is a relatively inexpensive process, using the multiple-phase techniques described herein to generate structured texture images allows generation of these images using much less processing power (and man-hours) than is required when the art is generated by artists using conventional programs (such as Adobe Photoshop). Accordingly, the multiple-phase technique described herein may be used to increase the throughput of a team of artists by allowing them to generate relatively simple input images and automatically (and inexpensively) cause the input images to be textured, without requiring an intensive effort to generate training data for the pix2pix ML model.

Neural Style Transfer

An art-based product generally includes classes of artwork (e.g., environment texture art) that are time-intensive and expensive to produce, but that require limited creative input from an artist. To illustrate, FIG. 3 depicts example texture images 302-312, which include a level of detail that is time-consuming to produce manually. Texture image 302 (grass texture) and texture image 304 (rough stone slab texture) depict unstructured textures because these textures include unstructured patterns, i.e., the features of the images are not required to include any particular pattern of structure lines/forms in order to communicate the desired texture. In other words, the blades of grass may be placed at random within image 302 and still communicate the idea of a grass texture. Similarly, the texture lines of the rock slab depicted in image 304 may also be placed at random and still communicate the rock texture.

In contrast, texture image 306 (stone wall texture), texture image 308 (cobblestone texture), texture image 310 (ornate metal texture), and texture image 312 (wood texture) are structured textures because they include particular patterns of structure lines/forms in order to depict the respective textures. For example, the stone wall texture of image 306 defines each stone with a visual rectangular boundary, and each stone in the stone wall texture is similarly highlighted to show that the depicted structures are on the same plane. As another example, the cobblestone texture of image 308 defines each cobblestone with an irregular visual boundary line, distinguishing each cobblestone from its neighbors, where each cobblestone fits with the neighboring cobblestones.

Figure 4:
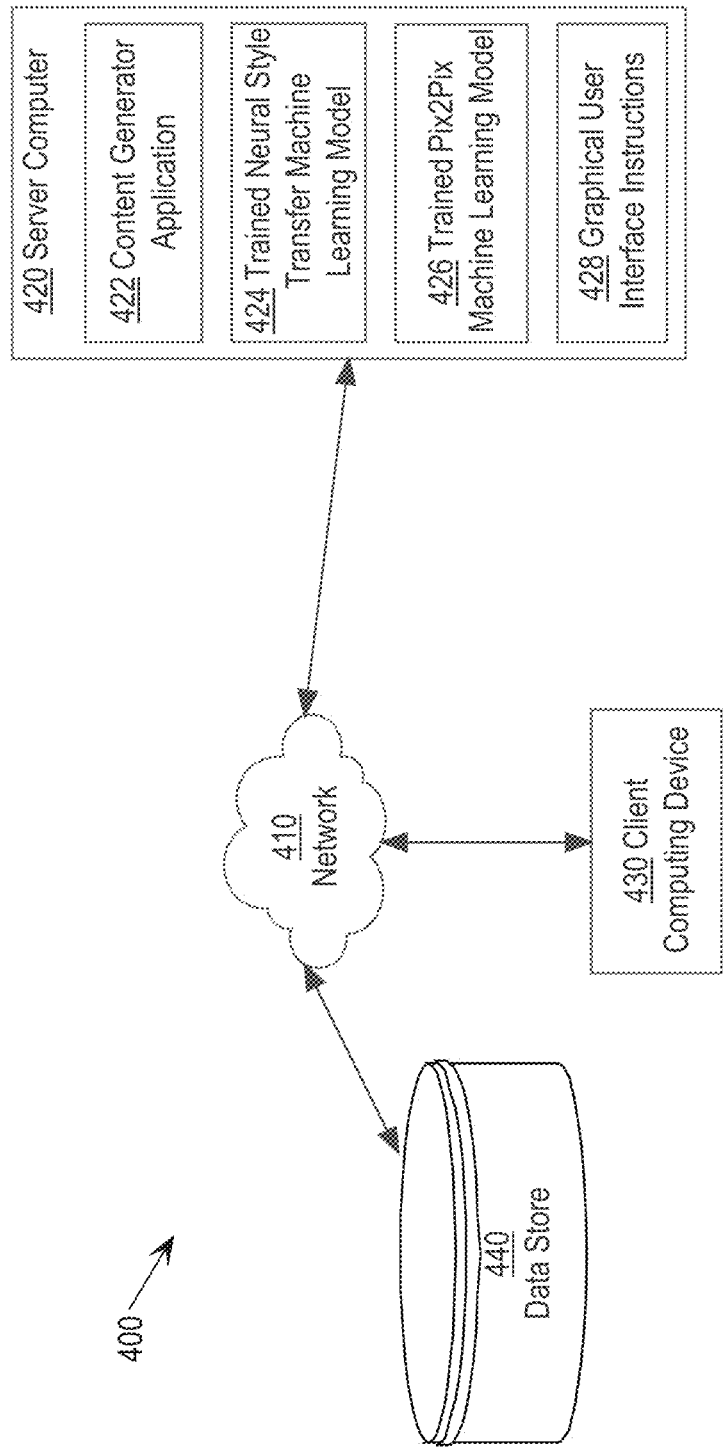
FIG. 4 depicts an example computing system, which includes a server computer running a content generator application that utilizes one or more machine learning models to automatically produce high-quality structured texture images.

A neural style transfer machine learning model, which is used to implement the neural style transfer technique described above, may be used to infer automatically-generated images based on artist-generated textures such as the textures depicted in images 302-312. FIG. 4 depicts an example computing system 400 with a server computer that includes an example trained neural style transfer (NST) ML model 424 used to implement the NST technique. Embodiments are described herein as being implemented on example computing system 400, but may be implemented on any configuration of computing system.

According to an embodiment, NST ML model 424 is a convolutional neural network, such as a VGG network, that applies the style of a given style input image to the content of a given content input image (see, e.g., FIG. 1). (For additional information regarding VGG networks, see "Very Deep Convolutional Networks for Large-Scale Image Recognition" by Karen Simonyan and Andrew Zisserman, 10 Apr. 2015, the entire contents of which is incorporated by reference as if fully set forth herein.) NST ML model 424 employs a content loss function (1) below, and a style loss function (2) below, which are combined according to a final loss function (3) below. Thus, the NST technique finds an image that minimizes the final loss function L, i.e., using iterative back-propagation via the NST ML model.

Content Loss Function (1):

$$L_{content} = \frac{1}{2}\sum_{i,j}\left(A_{ij}^{l}(g) - A_{ij}^{l}(c)\right)^2$$

where $A^{l}_{ij}(K)$ is the activation of the l th layer, i th feature map, and j th position obtained using the image K. $L_{content}$ is the root mean squared error between the activations produced by the generated image and the content image.

Style Loss Function (2):

$$L_{style} = \sum_{l} w^{l} L_{style}^{l} \text{ where,}$$

-continued $$L_{style}^l = \frac{1}{M^l}\sum_{ij}(G_{ij}^l(s) - G_{ij}^l g)^2 \text{ where,}$$

$$G_{ij}^l(I) = \sum_k A_{ik}^l(I)A_{jk}^l(I).$$

In style loss function (2), $w^l$ (chosen uniformly) is a weight given to each layer during loss computation and $M^l$ is a hyperparameter that depends on the size of the l th layer.
Final Loss Function (3):
where $\alpha$ and $\beta$ are user-defined hyperparameters. Here $\beta$ has absorbed the $M^l$ normalization $$L=\alpha L_{content}+\beta L_{style},$$

factor described earlier. The relative proportions of content from the content input image and style from the style input image that are incorporated into the automatically-generated image is controlled by the hyperparameters $\alpha$ and $\beta$ in final loss function (3).

Figure 5:
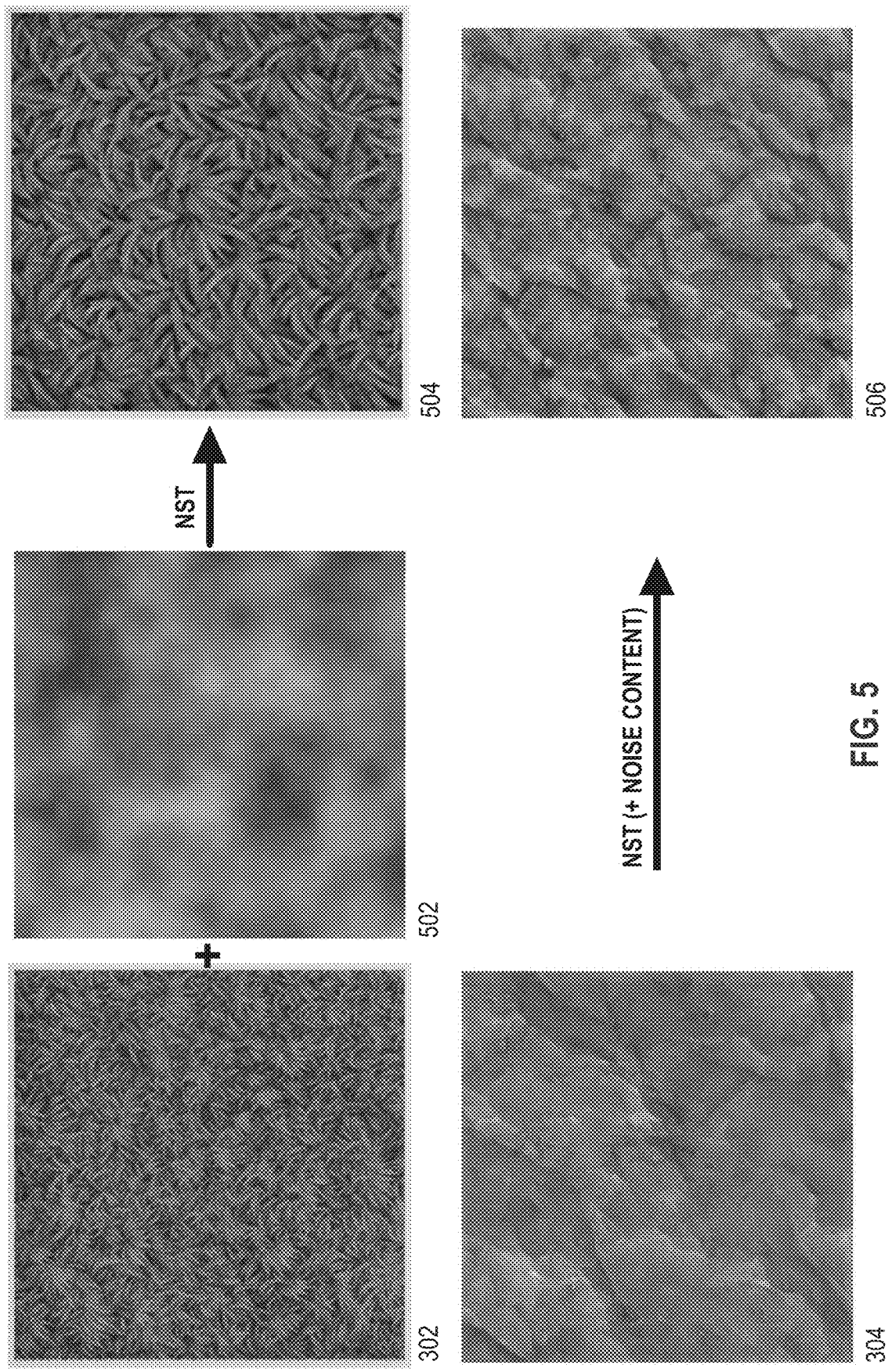
FIG. 5 depicts application of neural style transfer to infer automatically-generated images of unstructured textures.

FIG. 5 depicts the results of using NST ML model 424 to infer automatically-generated images of unstructured textures. Specifically, FIG. 5 depicts the results of using NST ML model 424 to apply the style of image 302 to a random noise-based content image 502 (e.g., populated with Perlin noise) to infer automatically generated image 504. While the scale of image 504 is different than the scale of image 302, application of the style of image 302 to noise image 502 results in a recognizable grass texture in image 504. Similarly, FIG. 5 depicts the results of using NST ML model 424 to apply the style of image 304 to random noise-based content image 502 to infer automatically generated image 506. As with the grass texture, the ML model was able to reproduce a recognizable (if more densely textured) rock slab in image 506.

FIG. 6 depicts the results of using NST ML model 424 to infer automatically-generated images of structured textures. Specifically, FIG. 6 depicts the results of using NST ML model 424 to apply the style of image 306 to random noise-based content image 502 to infer automatically generated image 602. FIG. 6 also depicts the results of using NST ML model 424 to apply the style of image 308 to random noise-based content image 502 to infer automatically generated image 604. Because these structured textures require particular patterns of structure lines/forms in order to depict the respective textures, applying the style of the structured textures to a random noise content image produces images 602 and 604 that lack the patterns of structure lines/forms present in images 306 and 308. In other words, the patterns of structure lines/forms in the structured textures that are required in order to depict the respective textures are randomized and broken in automatically-generated images 602 and 604. Thus, the structured textures are not properly communicated in these automatically-generated images.

It is further noted that the colorization of structured textures works to communicate the details of the texture. In automatically-generated images 602 and 604, the colorization (like the structure line pattern) is more random, which further reduces the ability of these images to communicate the intended texture. Thus, applying neural style transfer to transfer a structured texture having to a noise-based image does not result in a properly-structured output image.

Image-to-Image Translation

As described above, pix2pix-based ML models are able to perform image-to-image translation, as depicted in FIG. 2. Server computer 420 of FIG. 4 includes an example trained pix2pix ML model 426. The pix2pix technique allows for more supervision of texture generation, and, according an embodiment, is used to preserve regular patterns in structured textures.

Figure 7:
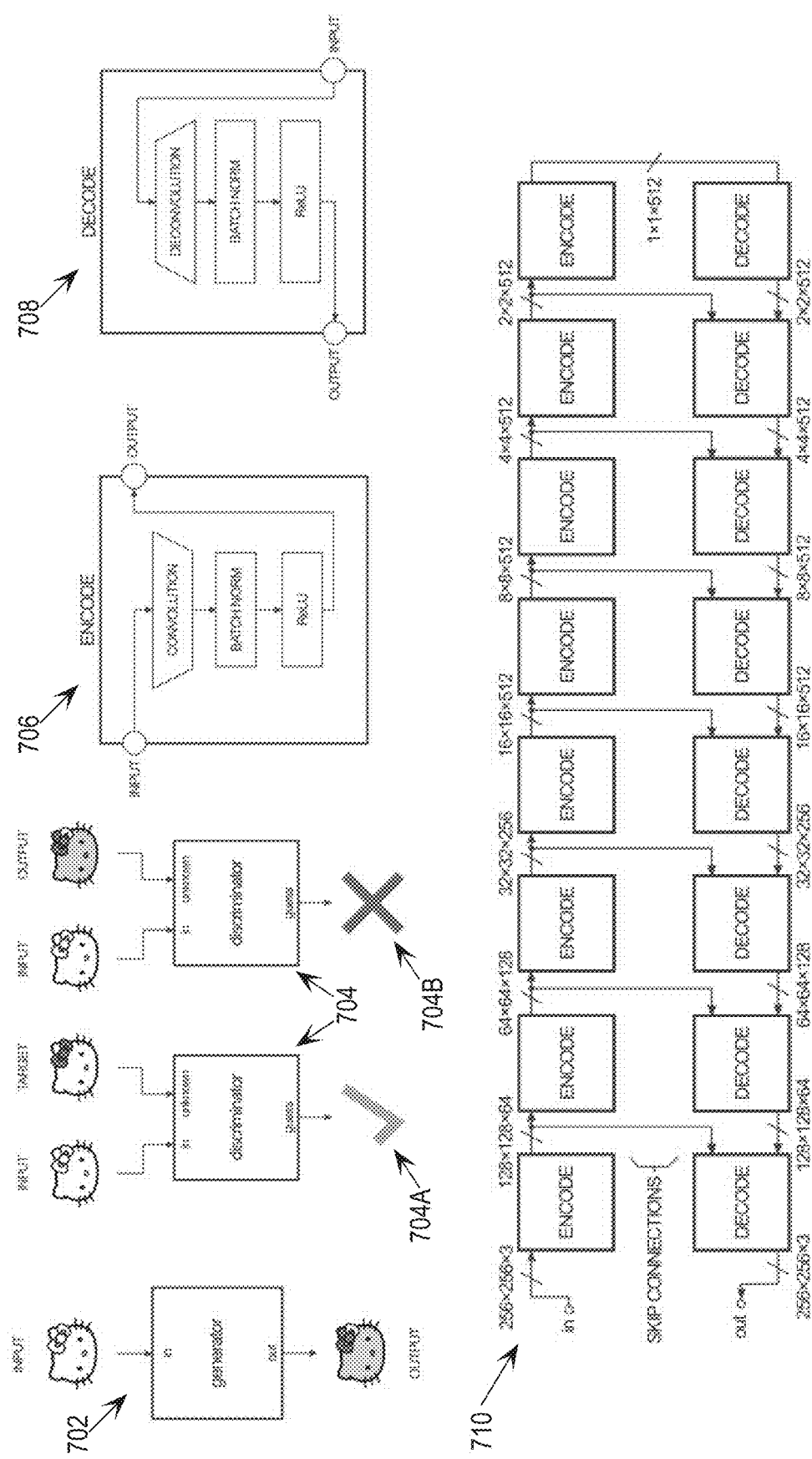
FIG. 7 depicts training of a cGAN-type machine learning model.

FIG. 7 depicts training of a cGAN-type ML model, such as pix2pix ML model 426. ML model 702 represents an image translation generator that is trained (using a training dataset of image pairs, where each image pair comprises an input image and a target output image that reflects the desired image translation) to translate an input image (e.g., input image 212 of FIG. 2), to an output image (e.g., output image 214 of FIG. 2). ML model 704 is a discriminator that is trained (using the same training data set as used for ML model 702) to determine whether a given image pair is a training image pair comprising a target output image (as shown by the checkmark-represented TRUE prediction 704A) or is an input/output image pair comprising a generated output image that was generated using ML model 702 (as shown by the cross-represented FALSE prediction 704B). It is noted that two instances of discriminator ML model 704 are depicted in FIG. 7 in order to show the two different predictions 704A and 704B. Ideal behavior of discriminator ML model 704 is a TRUE prediction when presented with a pair of images from the training dataset, and a FALSE prediction when presented with a pair of images comprising output from generator ML model 702.

Generator ML model 702 and discriminator ML model 704 are trained together in a competitive fashion. Specifically, as discriminator ML model 704 trains to discriminate between target and generated images, generator ML model 702 trains to generate images to beat discriminator ML model 704. Neural network diagram 710 is an illustration of a U-Net arrangement of encoder and decoder layers, which includes skip connections that directly connect encoder layers to decoder layers and allow bypassing of subsequent encoder/decoder layers, when warranted. (For additional information regarding U-Net, see "U-Net: Convolutional Networks for Biomedical Image Segmentation" by Ronneberger, et al., 18 May 2015, the entire contents of which is incorporated by reference as if fully set forth herein.) Diagram 706 depicts an encoder layer, which includes a convolution operation, as well as batch normalization and a rectified linear activation function (ReLU). Diagram 708 depicts a decoder layer, which includes a deconvolution operation, as well as batch normalization and a ReLU.

After training is complete, generator ML model 702 is used as trained pix2pix ML model 426. (For additional information regarding cGAN-type ML models, and training thereof, see "Conditional Generative Adversarial Nets" by Mehdi Mirza and Simon Osindero, 6 Nov. 2014, the entire contents of which is incorporated by reference as if fully set forth herein.)

Figure 8:
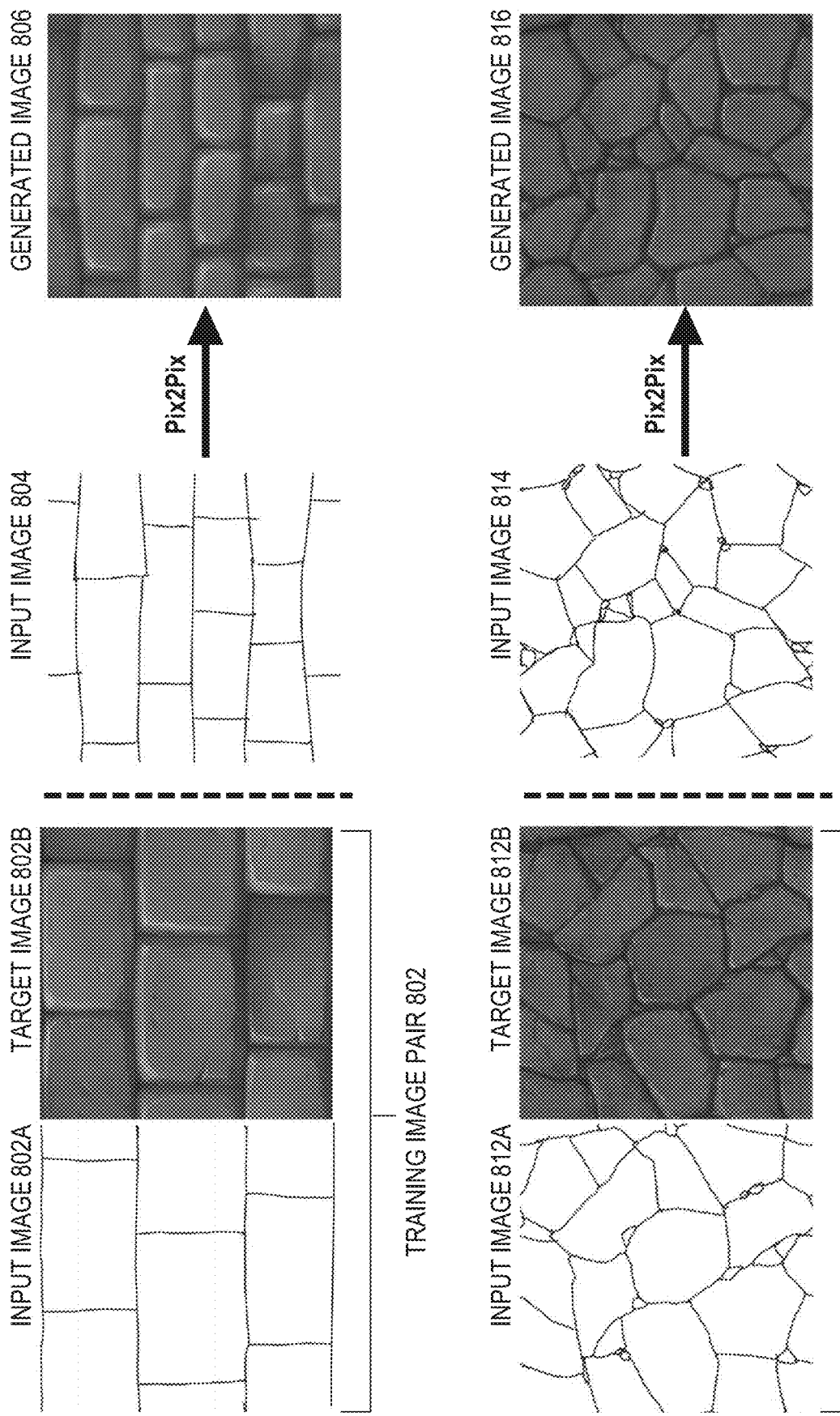
FIG. 8 depicts examples of application of a pix2pix machine learning model, trained using the depicted training images, to infer the depicted generated structured-texture images.

FIG. 8 depicts an example training image pair 802 with a training input image 802A and a corresponding training target image 802B, which shows the target transformation for the input image. To illustrate, a pix2pix ML model is trained using one or more training image pairs, such as training image pair 802, to produce trained pix2pix ML model 426. After being trained, pix2pix ML model 426 is used to infer, from an input image 804 that was not part of the training dataset, a transformed output image, i.e., generated image 806. As a further illustration, a pix2pix ML model is trained using one or more training image pairs, such as training image pair 812, to produce trained pix2pix ML model 426. After being trained, trained pix2pix ML model 426 is used to infer, from an input image 814 that was not part of the training dataset, a transformed output image, i.e., generated image 816.

As shown, each of generated images 806 and 816 includes a strong representation of the visual pattern of structure lines indicated in the corresponding input image, thereby preserving the structured texture depiction in the output images. The preservation of the structured texture is an improvement over application of NST with a noise-based content image to produce automatically-generated structured texture images (see, e.g., NST-generated images 602 and 604 depicted in FIG. 6).

However, generated images 806 and 816 do not have the amount of detail that is included in the target images of the respective training datasets. For example, the structure lines in the output images are somewhat blurry, and many style details present in the respective target images, such as the divots and dents in the stones, are generally not reflected in the ML-generated images. This lack of detail may be attributed to a relatively small training dataset (e.g., under 20 training image pairs) used to train pix2pix ML model 426. As indicated above, the particular image translation capability and quality of output images from a pix2pix ML model is dependent on the size and variety of images in a training dataset on which the model is trained. Thus, the output images from a pix2pix ML model that is trained on a relatively small training dataset will generally not have the level of detail that is included in the training dataset target images.

The size of a training dataset may be limited because training image pairs, such as pair 802 and pair 812, are expensive to create. Furthermore, when textures are being drawn by hand, many times an initial drawing (such as a line drawing depicted in FIG. 8 or a color block drawing described in further detail below) that may serve as an input image for a training dataset pair does not reflect the structure pattern of the finished version of the drawing. Specifically, an artist generally makes changes to the initial design of a texture image ("texture blockout") during the process of adding details to the texture, anywhere from small tweaks that deviate from the initial design to completely reworking the initially-planned structure definitions. As such, it can be very challenging and expensive to a mass a large amount of training data to allow a trained pix2pix ML model to learn how to add a high level of detail to generated images.

Two-Phase Image Translation for High-Quality Texture Output Images

Attempts have been made to combine the NST loss functions into the cGAN of the pix2pix technique. However, such combinations are complicated, and it is not clear what hyperparameters for the resulting hybrid ML model might result in the best-quality structured textures. Thus, according to an embodiment, a multiple-phase process is used to transform an input image that defines a structured texture to a high-quality textured image that retains the structure of the texture, without requiring training a pix2pix ML model based on a large training dataset and without requiring generation and tuning of a hybrid ML model.

FIG. 9 depicts a flowchart for a multiple-phase process that uses ML models to produce a texturized version of an input image. The flowchart of FIG. 9 is illustrated herein using an example content generator application 422, running on a server computer 420 of example computing system 400 (FIG. 4), which that utilizes ML models, including NST ML model 424 and pix2pix ML model 426.

At step 902, a machine learning model is trained, using a training dataset, to produce a first trained machine learning model, where the training dataset comprises one or more pairs of images, wherein each pair of images, of the one or more pairs of images, comprises an input image that visually defines a plurality of distinct image areas and a target image that depicts a texturized version of each distinct image area of the plurality of distinct image areas. For example, a cGAN ML model is trained, using at least training image pair 802, to produce trained pix2pix ML model 426.

Figure 10:
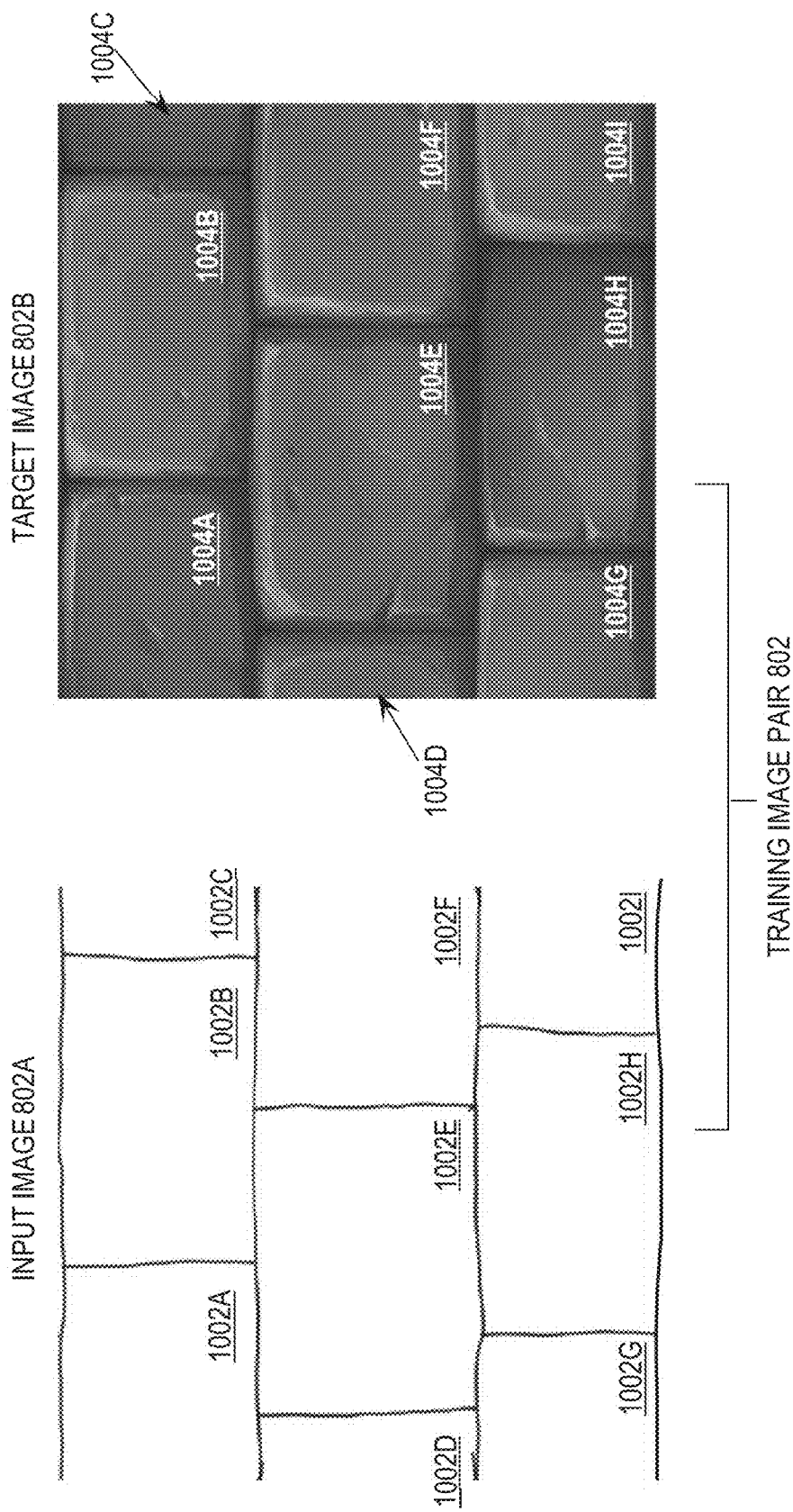
FIG. 10 depicts a plurality of distinct image areas within the images of an example training image pair.

FIG. 10 depicts training image pair 802 in greater detail. Specifically, as depicted in FIG. 10, input image 802A visually defines a plurality of distinct image areas 1002A-I ("bricks") via the structure lines depicted in the image. As shown in FIG. 10, target image 802B depicts a corresponding texturized image area (areas 1004A-I) for each distinct image area of the plurality of distinct image areas 1002A-I of the input image.

Figure 11:
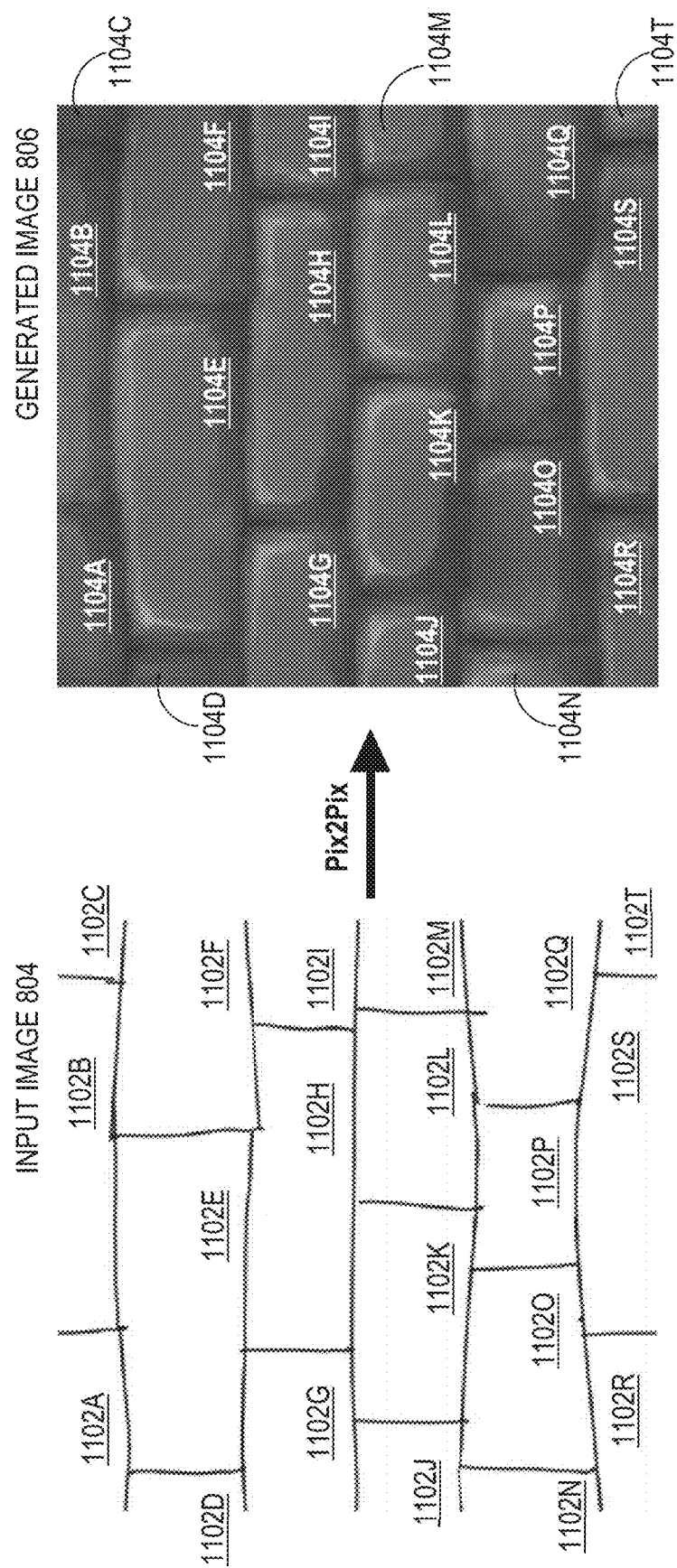
FIG. 11 depicts a plurality of distinct image areas within an example input image and within an example automatically-generated image that was generated based on the example input image.

At step 904, a request to texturize a particular input image that visually defines a particular plurality of distinct image areas is received. For example, content generator application 422 receives a request, from an application at client computing device 430 of system 400 (FIG. 4), to texturize input image 804. As shown in greater detail in FIG. 11, input image 804 visually defines a plurality of distinct image areas 1102A-T using structure lines.

At step 906, a multiple-phase operation to produce a styled texturized output image based on the particular input image is performed. For example, content generator application 422 performs multiple phases, comprising steps 908-910, to produce a styled and texturized output image 806 based on input image 804.

Figure 12:
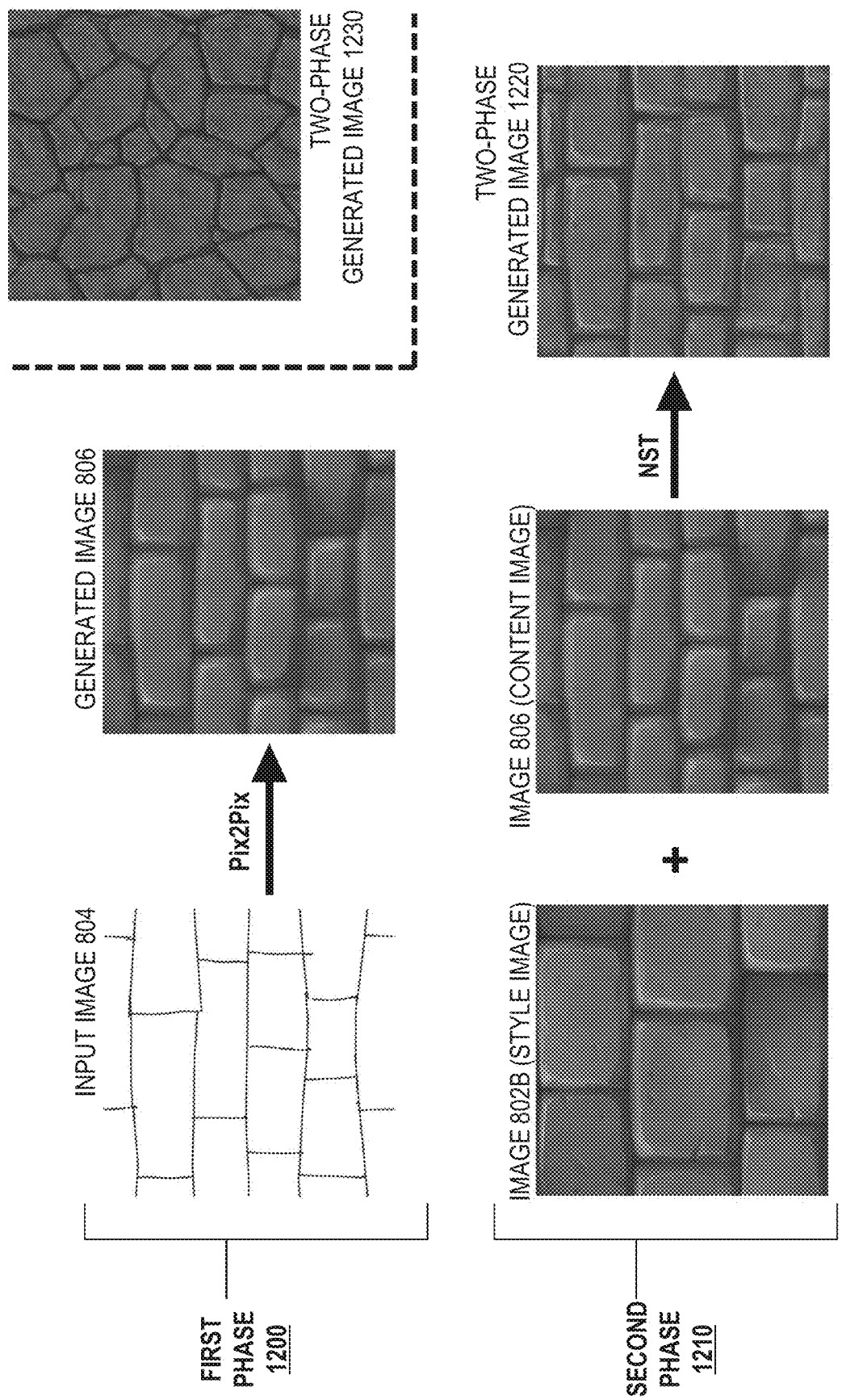
FIG. 12 depicts example images illustrating a multiple-phase process using machine learning models to produce a texturized version of an input image.

At step 908, during a first phase of the multiple-phase operation: based on the particular input image, the first trained machine learning model is used to infer a textured output image that depicts an automatically-generated texture for each distinct image area of the particular plurality of distinct image areas. For example, as depicted in FIG. 12, during a first phase 1200, content generator application 422 uses trained pix2pix ML model 426 to infer generated image 806 based on input image 804. Generated image 806 depicts an automatically-generated textured image area (1104A-T depicted in FIG. 11) for each distinct image area (1102A-T) of the particular plurality of distinct image areas of input image 804. As indicated above, generated image 806 includes less style details and less clarity than target image 802B.

At step 910, during a second phase of the multiple-phase operation: based on (a) the textured output image produced during the first phase of the multiple-phase operation and (b) a style input image, a second trained machine learning model configured to perform neural style transfer is used to infer the styled texturized output image that incorporates content of the textured output image and reflects one or more style aspects of the style input image. For example, as depicted in FIG. 12, during a second phase 1210, content generator application 422 uses NST ML model 424 to infer a two-phase-generated image 1220 based on a style image (e.g., image 802B) and image 806 as the content image. Using NST to apply style details from an artist-generated source image to an automatically-generated image increases the level of detail included in the generated image without requiring an increase in the size of the training dataset for trained pix2pix ML model 426.

FIG. 12 further depicts a second example two-phase-generated image 1230 that is generated according to a first phase 1200 by which generated image 816 is generated using a trained pix2pix ML model 426 (e.g., trained using at least training image pair 812) based on input image 814, and a second phase 1210 by which NST ML model 424 is used to infer two-phase generated image 1230 based on style image 812B and a content image 816.

At step 912, the styled texturized output image is returned as a response to the request. For example, content generator application 422 returns, to client computing device 430, at least two-phase generated image 1220 as a response to the request to texturize input image 804.

According to an embodiment, the style image for the second phase of the multiple-phase operation is selected based on information, associated with the request to add texture to an input image, that identifies a particular style. For example, the request to produce a texturized version of input image 804 includes the style identifier "styleA". In this example, server computer 420 maintains metadata that maps "styleA" to image 802B. During the second phase, content generator application 422 identifies image 802B to be the style image for the neural style transfer based on the style identifier included in the request to texturize input image 804 and the metadata maintained by server computer 420.

As another example, the request to produce a texturized version of input image 804 includes the style identifier "styleA" and server computer 420 maintains metadata that maps "styleA" to a plurality of images that includes image 802B. Thus, during the second phase and based on the style identifier in the request and the metadata maintained by server computer 420, content generator application 422 applies the styles of each style image, associated with "styleA" in the maintained metadata, to image 806 as the content image to produce a plurality of styled texturized output images. In this case, at step 912, the plurality of styled texturized output images is returned as a response to the request.

According to another embodiment, the request to produce a texturized version of input image 804 does not include any indication of a style to be applied during the second phase, and, accordingly, one or more default style images are used during the second phase of the multiple-phase process.

Combination of an Intermediate Image with a Generated Image

Figure 13:
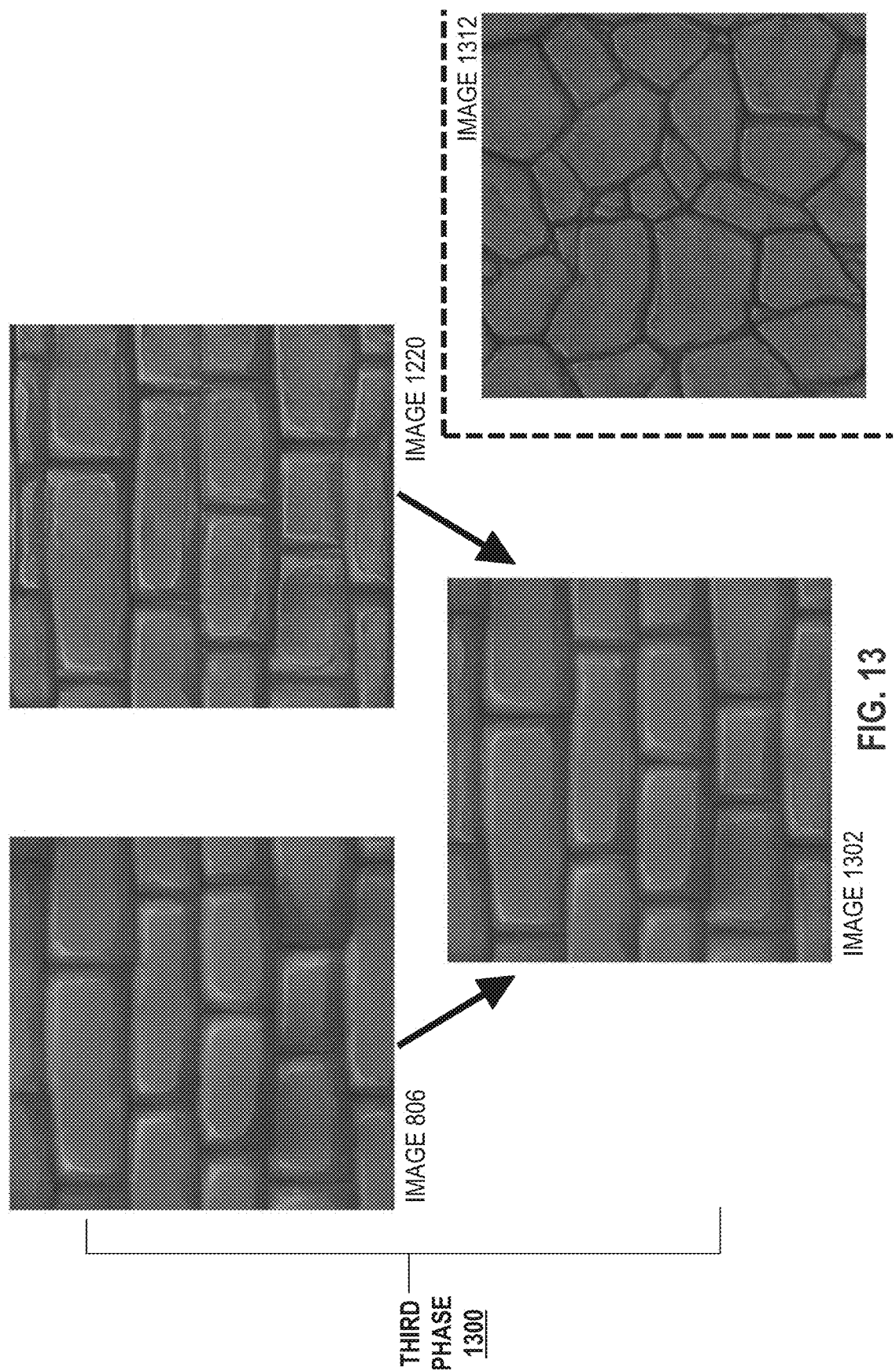
FIG. 13 combining generated images to produce a modified generated image.

According to an embodiment, before returning the generated image as a response to the request to texturize an input image, content generator application 422 applies a third phase of the multiple-phase process to further refine the generated textured and styled image. Specifically, as depicted in FIG. 13, during a third phase 1300 of the multiple-phase process, content generator application 422 modifies the styled texturized output image produced during the second phase by combining the styled texturized output image (produced during the second phase) with the textured output image produced during the first phase to produce a modified styled output image. FIG. 13 depicts an example modified styled output image 1302 produced during the third phase by combining image 806 and image 1220. FIG. 13 further depicts another example modified styled output image 1312 produced during the third phase by combining image 816 and image 1230.

According to an embodiment, these first- and second-phase images are combined by reducing the opacity of one of the images (e.g., second-phase image 1220 or first-phase image 806) and combining each pixel value of the opacity-adjusted image with a corresponding pixel value of the other image to produce modified image 1302.

According to an embodiment, content generator application 422 maintains a parameter value that indicates which image is to have adjusted opacity for the third phase and/or the level of opacity to be used for the third phase. According to an embodiment, the request to texturize input image 804 includes one or both of these parameters, i.e., which image is to have adjusted opacity and/or the level of opacity to be used for the third phase. According to an embodiment, the opacity of a default image (e.g., the second-phase image) is adjusted for the third phase.

According to an embodiment, the third phase is automatically performed without user intervention. According to another embodiment, the third phase is performed according to user instructions, e.g., where the instructions are received via a graphical user interface displayed via client computing device 430.

Input Image Labeling

As indicated above, example input image 802A and example input image 804 are line drawings that outline each "brick" in the texture using structure lines with consistent attributes (i.e., solid black lines with the same weight and style throughout). However, embodiments are not limited to this style of mark-up for input images. For example, for line drawing input images, different line attributes (such as color, thickness, dash style, etc.) may be used to indicate different aspects of the texture.

Figure 14:
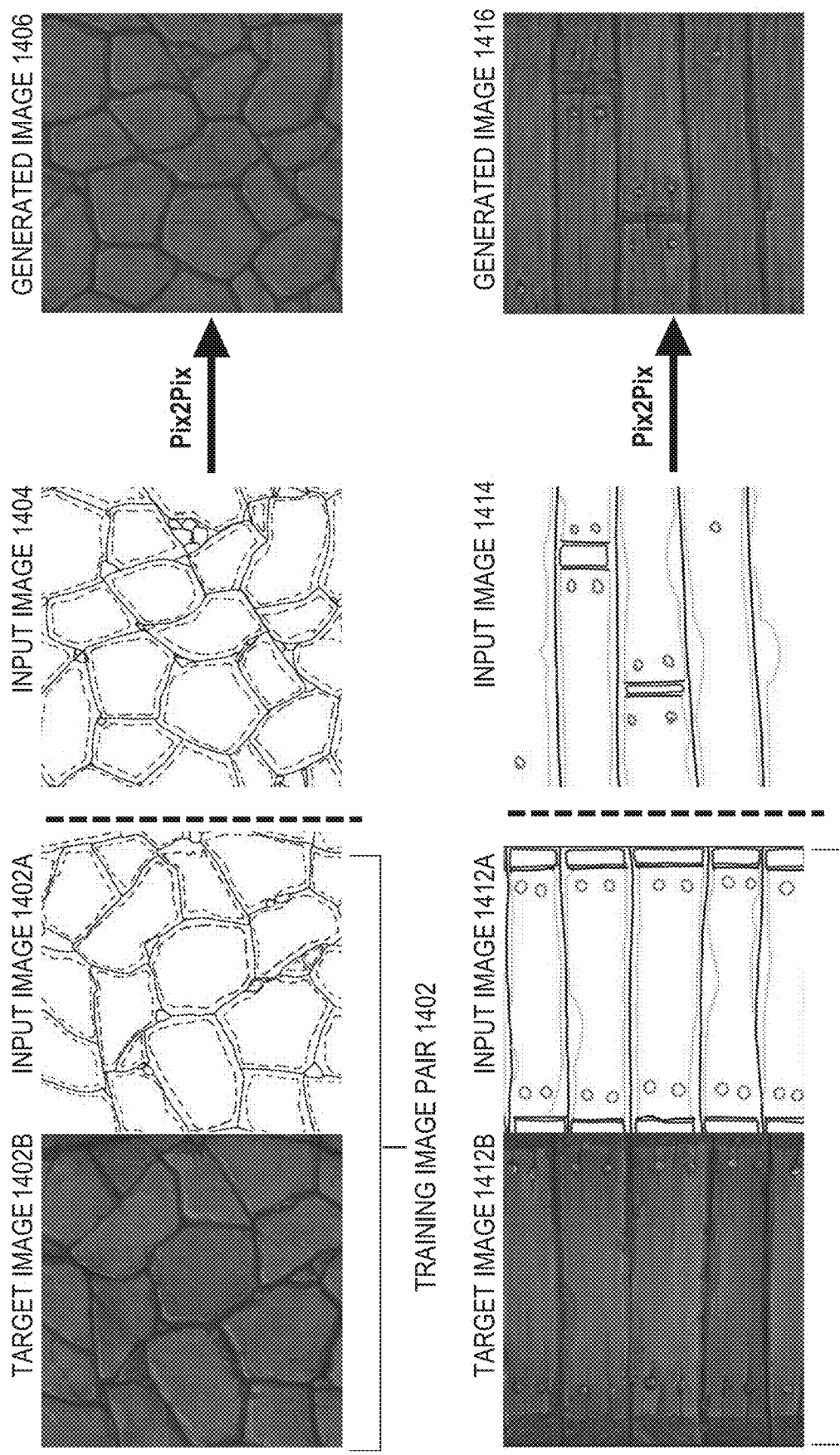
FIG. 14 depicts application of the multiple-phase process to produce detailed structured-texture images based on a multi-line style of input image.

To illustrate, FIG. 14 depicts an example training image pair 1402 that depicts a structured cobblestone texture with dashed contour lines the indicate where the stones defined by the non-dashed structure lines stop being flat on the edges. This kind of contouring mark-up gives greater control over the details of the images that are generated according to techniques described herein. To illustrate, pix2pix ML model 426 is trained using at least training image pair 1402, and based in part on the trained model, content generator application 422 generates texture image 1406 from input image 1404 using the multiple-phase process described above. The texture structure and contours of generated image 1406 are generated based on the solid structure lines and dashed contour lines of input image 1404.

FIG. 14 further depicts another example training image pair 1412, which depicts structured wood texture, with each of contour, nails, and end-grains indicated using different-colored lines. Again, this type of mark-up allows for greater control over the generated images, including positions of nails in boards, as well as where the boards should be rough-textured, or where board end-grains should be shown. To illustrate, pix2pix ML model 426 is trained using at least training image pair 1412, and based in part on the trained model, content generator application 422 generates texture image 1416 from input image 1414 using the multiple-phase process described above. The placement of boards (based on black structure lines), as well as the placement of nails, rough texture, and end-grains in generated image 1416 are controlled by the different-colored mark-up lines of input image 1414. Accordingly, using this data, an artist creating an input image has more control over the details of generated texture image 1416 generated by content generator application 422, according to techniques described herein.

Figure 15:
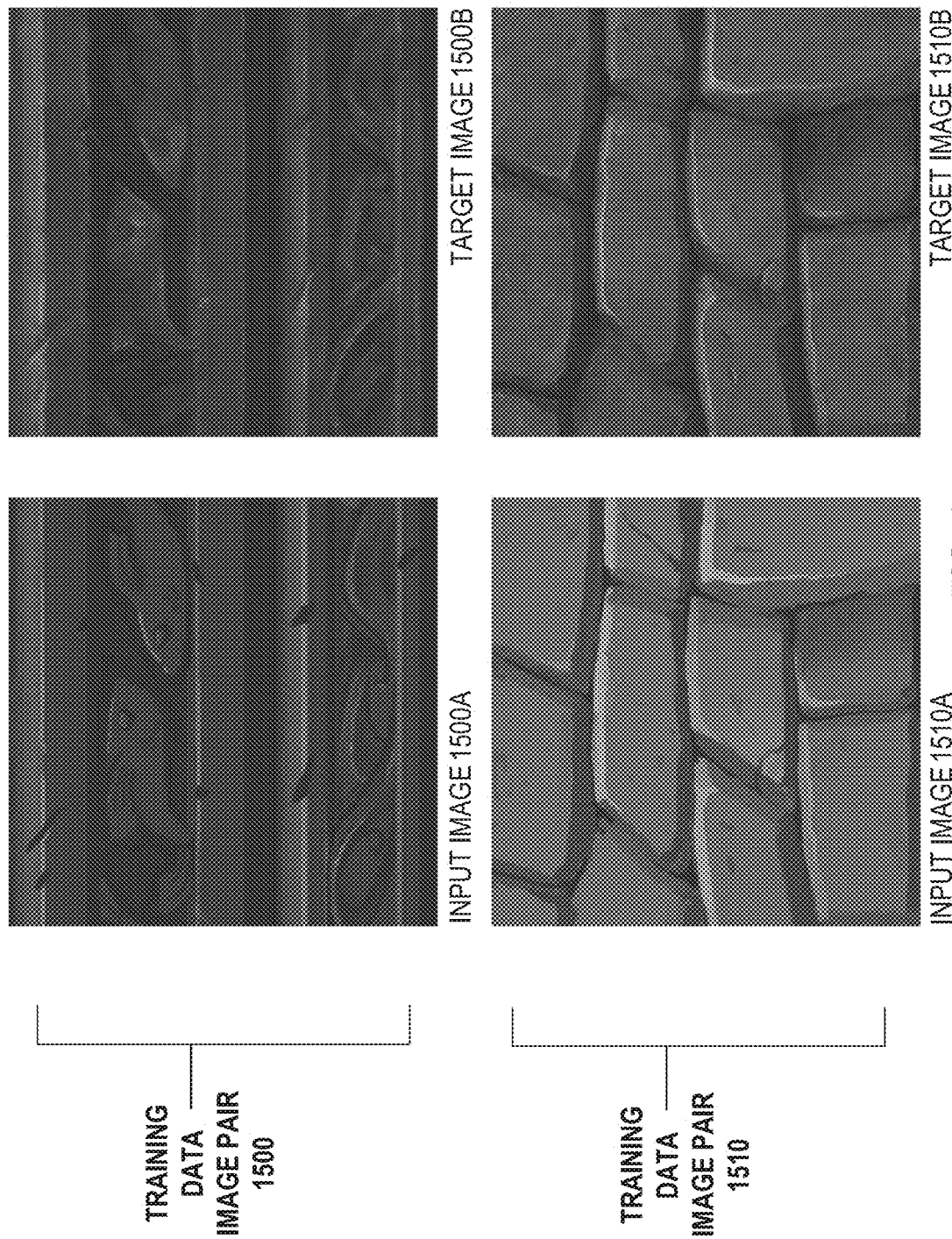
FIG. 15 depicts training data image pairs, where the input images are color block-style input images

Furthermore, other ways of indicating distinct image areas may be used, such as color blocking described in further detail below, a mixture of line drawing and color blocking, etc. FIG. 15 depicts training data image pairs 1500 and 1510, where the respective input images 1500A and 1510A are color block-style input images. The various image areas used by content generator application 422 to identify where texture depictions should be placed are indicated by different blocks of color in the input images. FIG. 16 depicts input image 1510A and target image 1510B in further detail. Specifically, FIG. 16 identifies example color blocks 1602 in input image 1510A and corresponding textured image areas 1604 in target image 1510B.

Automatic Colorization Based on Input Image Color Blocking

The colorization of an image generated according to the multiple-phase process described herein depends on the colors that are included in target images of the training data set for pix2pix ML model 426. For example, FIG. 17 depicts a color block-style input image 1700. According to techniques described above, content generator application 422 uses the multiple-phase process to automatically generate image 1702 based on input image 1700. In this example, input image 1700 is color-blocked in shades of tan and brown, and generated image 1702 includes shades of gray, blue, with hints of gold. Thus, the coloring of generated image 1702 varies widely from the colors of input image 1700. In this case, the trained pix2pix ML model did not learn from the training dataset that the coloring of a color-blocked input image should be reflected in the output image. In fact, it is unlikely that a pix2pix ML model would learn nuances of coloring using color-blocked input images based on the limited samples that are generally found in a small training dataset.

At times, the colors used for color blocking of an input image reflects a desired coloring of the final generated image. Thus, according to an embodiment, content generator application 422 automatically adjusts the coloring of a generated image, such as generated image 1702, to align with the colors in the color blocks of the input image 1700. Specifically, content generator application 422 modifies the styled texturized output image (e.g., image 1702), to produce a modified styled output image (e.g., color-adjusted image 1704), by causing coloring of each image area, of one or more image areas of the plurality of distinct textured and styled image areas, to be based on a corresponding color block of the plurality of color blocks of the particular input image.

For example, content generator application 422 uses least squares between corresponding patches of the color-blocked input image and the generated output image to identify the color modifications required for each patch of the generated output image to produce the color-corrected image. (For additional information regarding using least squares for color correction, see "The alternating least squares technique for nonuniform intensity color correction" by Finlayson et al., 24 May 2014, the entire contents of which is incorporated by reference as if fully set forth herein.)

FIG. 17 further includes another example color-blocked input image 1710, which is predominantly colored in shades of brown with some light tan and gray-brown blocks. Based on input image 1710, content generator application 422 generates image 1712 using the multiple-phase process described herein. Generated image 1712 is predominantly pinkish-brown with shades of blue, gold, and tan throughout. As such, the coloring of generated image 1712 is different from the coloring of input image 1710. Content generator application 422 further produces a color-adjusted image 1714 by color-adjusting generated image 1712 based on the colors in input image 1710.

Content generator application 422 provides the color adjusted image (e.g., image 1704 or image 1714) as a result of the request to texturize the input image instead of or in addition to the non-color-corrected generated image (e.g., image 1702 or image 1714).

Structural Overview

As indicated above, FIG. 4 depicts a computing system 400 comprising a server computer 420, a client computing device 430, and a data store 440 communicatively coupled over network 410. Network 410 broadly represents any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 4. The various elements of FIG. 4 may also have direct (wired or wireless) communications links. The data store 440, server computer 420, client computing device 430, and other elements of the system each comprise an interface compatible with the network 410 and are programmed or configured to use standardized protocols for communication across the networks such as TCP/IP, Bluetooth, CAN protocol and higher-layer protocols such as HTTP, TLS, and the like.

Data store 440 comprises a storage medium configured to store one or more training datasets for one or both of ML models 424 and 426. Data store 440 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

Server computer 420 may be implemented using a server-class computer or other computers having one or more processor cores, co-processors, or other computers. Server computer 420 may be a physical server computer and/or a virtual server instance stored in a data center, such as through cloud computing.

Server computer 420 runs content generator application 422. Generally, an application is a combination of integrated software components and an allocation of computational resources, such as memory, a vertex, and processes on the vertex for executing the integrated software components, where the combination of the software and computational resources are dedicated to providing a particular type of function. As described herein, attribution of a particular function to a particular entity (such as content generator application 422) may be performed by a different entity, whether depicted or not depicted in FIG. 4.

Server computer 420 further stores trained NST ML model 424 and trained pix2pix ML model 426, and also graphical user interface instructions 428. Server computer 420 is configured to receive input data from a client computing device 430, to use one or more trained machine learning models/systems to compute one or more outputs, and to provide the one or more outputs to the client computing device 430.

Graphical user interface instructions 428 comprise computer readable instructions which, when executed by the server computer 420 cause the server computer to generate and cause a graphical user interface to be displayed on client computing device 430. The graphical user interface may be generated by the server computer 420 and/or by the client computing device 430.

The client computing device 430 is a computer that includes hardware capable of communicatively coupling the device to one or more server computer, such as server computer 420, over one or more service provides. For example, client computing device 430 may include a network card that communicates with server computer 420 through a home or office wireless router (not illustrated in FIG. 4) coupled to an internet service provider. The client computing device 430 may be a smart phone, personal computer, tabled computing device, PDA, laptop, or any other computing device capable of transmitting and receiving information and performing the functions described herein.

For purposes of illustrating a clear example, FIG. 4 shows a limited number of instances of certain functional elements. However, in other embodiments, there may be any number of such elements. For example, server computer 420 may receive requests from any number of client computing devices 430. Further, the server computer 420 may be implemented using two or more processor cores, clusters, or instances of physical machines or virtual machines, configured in a discreet location or co-located with other elements in a datacenter, share computing facility, or cloud computing facility. In other embodiments, one or more of the elements depicted herein may be combined. For example, a client computing device may store the trained machine learning systems. As another example, a same server computer or two different server computers may perform the training of the machine learning system and the computation of outputs using the trained machine learning system.

Machine Learning Model

A machine learning model is trained using a particular machine learning algorithm. Once trained, input is applied to the machine learning model to make a prediction, which may also be referred to herein as a predicated output or output.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output, as described above. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e., configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, Matlab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input node, the activation value is simply an input value for the input. For an activation neuron, the activation value is the output of the respective activation function of the activation neuron.

Each edge from a particular node to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation node, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of nodes in layer L−1 and L is N[L−1] and N[L], respectively, the dimensions of matrix W are N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input node. The particular input may be stored as vector. Training data comprises multiple inputs, each being referred to as sample in a set of samples. Each sample includes a value for each input node. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every node in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of nodes and/or edges determines the size of matrices needed to implement a neural network. The smaller the number of nodes and edges in a neural network, the smaller matrices and amount of memory needed to store matrices. In addition, a smaller number of nodes and edges reduces the amount of computation needed to apply or train a neural network. Less nodes means less activation values need be computed, and/or less derivative values need be computed during training.

Properties of matrices used to implement a neural network correspond neurons and edges. A cell in a matrix W represents a particular edge from a node in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e., number of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e., ceases to reduce) or vanishes beneath a threshold (i.e., approaches zero). Example mathematical formulae and techniques for feedforward multilayer perceptron (MLP), including matrix operations and backpropagation, are taught in a related reference "Exact Calculation Of The Hessian Matrix For The Multi-Layer Perceptron," by Christopher M. Bishop, the entire contents of which are hereby incorporated by reference as if fully set forth herein.

Model training may be supervised or unsupervised. For supervised training, the desired (i.e., correct) output is already known for each example in a training set. The training set is configured in advance by (e.g., a human expert, or via the labeling algorithm described above) assigning a categorization label to each example. For example, the training set for an ML model is labeled, by an administrator, with the workload types and/or operating systems running on the server device at the time the historical utilization data was gathered. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas unsupervised training discovers an apt intermediate vocabulary based more or less entirely on statistical tendencies that reliably converge upon optimality with sufficient training due to the internal feedback by regenerated decodings. A supervised or unsupervised ANN model may be elevated as a first class object that is amenable to management techniques such as monitoring and governance during model development such as during training.

Deep Context—Recurrent Neural Network

As described above, an ANN may be stateless such that timing of activation is more or less irrelevant to ANN behavior. For example, recognizing a particular letter may occur in isolation and without context. More complicated classifications may be more or less dependent upon additional contextual information. For example, the information content (i.e., complexity) of a momentary input may be less than the information content of the surrounding context. Thus, semantics may occur based on context, such as a temporal sequence across inputs or an extended pattern (e.g., compound geometry) within an input example. Various techniques have emerged that make deep learning be contextual. One general strategy is contextual encoding, which packs a stimulus input and its context (i.e., surrounding/related details) into a same (e.g., densely) encoded unit that may be applied to an ANN for analysis. One form of contextual encoding is graph embedding, which constructs and prunes (i.e., limits the extent of) a logical graph of (e.g., temporally or semantically) related events or records. The graph embedding may be used as a contextual encoding and input stimulus to an ANN.

Hidden state (i.e., memory) is a powerful ANN enhancement for (especially temporal) sequence processing. Sequencing may facilitate prediction and operational anomaly detection, which can be important techniques. A recurrent neural network (RNN) is a stateful MLP that is arranged in topological steps that may operate more or less as stages of a processing pipeline. In a folded/rolled embodiment, all of the steps have identical connection weights and may share a single one dimensional weight vector for all steps. In a recursive embodiment, there is only one step that recycles some of its output back into the one step to recursively achieve sequencing. In an unrolled/unfolded embodiment, each step may have distinct connection weights. For example, the weights of each step may occur in a respective column of a two dimensional weight matrix.

A sequence of inputs may be simultaneously or sequentially applied to respective steps of an RNN to cause analysis of the whole sequence. For each input in the sequence, the RNN predicts a next sequential input based on all previous inputs in the sequence. An RNN may predict or otherwise output almost all of the input sequence already received and also a next sequential input not yet received. Prediction of a next input by itself may be valuable. Comparison of a predicted sequence to an actually received (and applied) sequence may facilitate anomaly detection, as described in detail above.

Unlike a neural layer that is composed of individual neurons, each recurrence step of an RNN may be an MLP that is composed of cells, with each cell containing a few specially arranged neurons. An RNN cell operates as a unit of memory. An RNN cell may be implemented by a long short term memory (LSTM) cell. The way LSTM arranges neurons is different from how transistors are arranged in a flip flop, but a same theme of a few control gates that are specially arranged to be stateful is a goal shared by LSTM and digital logic. For example, a neural memory cell may have an input gate, an output gate, and a forget (i.e., reset) gate. Unlike a binary circuit, the input and output gates may conduct an (e.g., unit normalized) numeric value that is retained by the cell, also as a numeric value.

An RNN has two major internal enhancements over other MLPs. The first is localized memory cells such as LSTM, which involves microscopic details. The other is cross activation of recurrence steps, which is macroscopic (i.e., gross topology). Each step receives two inputs and outputs two outputs. One input is external activation from an item in an input sequence. The other input is an output of the adjacent previous step that may embed details from some or all previous steps, which achieves sequential history (i.e., temporal context). The other output is a predicted next item in the sequence.

Sophisticated analysis may be achieved by a so-called stack of MLPs. An example stack may sandwich an RNN between an upstream encoder ANN and a downstream decoder ANN, either or both of which may be an autoencoder. The stack may have fan-in and/or fan-out between MLPs. For example, an RNN may directly activate two downstream ANNs, such as an anomaly detector and an autodecoder. The autodecoder might be present only during model training for purposes such as visibility for monitoring training or in a feedback loop for unsupervised training. RNN model training may use backpropagation through time, which is a technique that may achieve higher accuracy for an RNN model than with ordinary backpropagation.

Deep Context—Convolutional Neural Network

A convolutional neural network (CNN) is an MLP that incorporates at least one convolutional layer, which utilizes convolution (i.e., via multiplication or other dot product) in place of general matrix multiplication. For additional information regarding CNNs, see Chapter 9 ("Convolutional Networks") of Deep Learning by Ian Goodfellow, Yoshua Bengio, and Aaron Courville, MIT Press, 2016, the entire contents of which are incorporated by reference as if fully set forth herein.

Random Forest

Random forests or random decision forests are an ensemble of learning approaches that construct a collection of randomly generated nodes and decision trees during the training phase. The different decision trees are constructed to be each randomly restricted to only particular subsets of feature dimensions of the data set. Therefore, the decision trees gain accuracy as the decision trees grow without being forced to over fit the training data as would happen if the decision trees were forced to be restricted to all the feature dimensions of the data set. Predictions for the time-series are calculated based on the mean of the predictions from the different decision trees.

The following is an example and non-limiting method of training a set of Random Forest models for making estimations of network I/O utilization for an example model type, i.e., a ToR switch ML model, according to an embodiment. A best trained Random Forest ToR switch ML model is selected, from a set of models resulting from the training phase, to be the basis for instances of a trained ToR switch ML model deployed to respective ToR switches in a datacenter. A computer system produces a training data set for an ML model, as described in detail above. In one or more embodiments, the computer system preprocesses the historical utilization data gathered from the non-OS sources prior to labeling the training data that will be used to train the Random Forest ToR switch ML model. The preprocessing may include cleaning the readings for null value s, normalizing the data, downsampling the features, etc.

In an embodiment, the computer system receives hyper-parameter specifications for the Random Forest ToR switch ML model to be trained. Without limitation, these hyper-parameters may include values of model parameters such as number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

A computer system trains the Random Forest ToR switch ML model using the specified hyper-parameters and the training data set (or the preprocessed sequence training data, if applicable). The trained model is evaluated using the test and validation data sets, as described above.

According to embodiments, a determination is made of whether to generate another set of hyper-parameter specifications. If so, another set of hyper-parameter specifications is generated and the computer system trains another Random Forest ToR switch ML model having the new set of hyper-meters specified. All Random Forest ToR switch ML models trained during this training phase are the set of models from which the best trained ToR switch ML model is chosen.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 18:
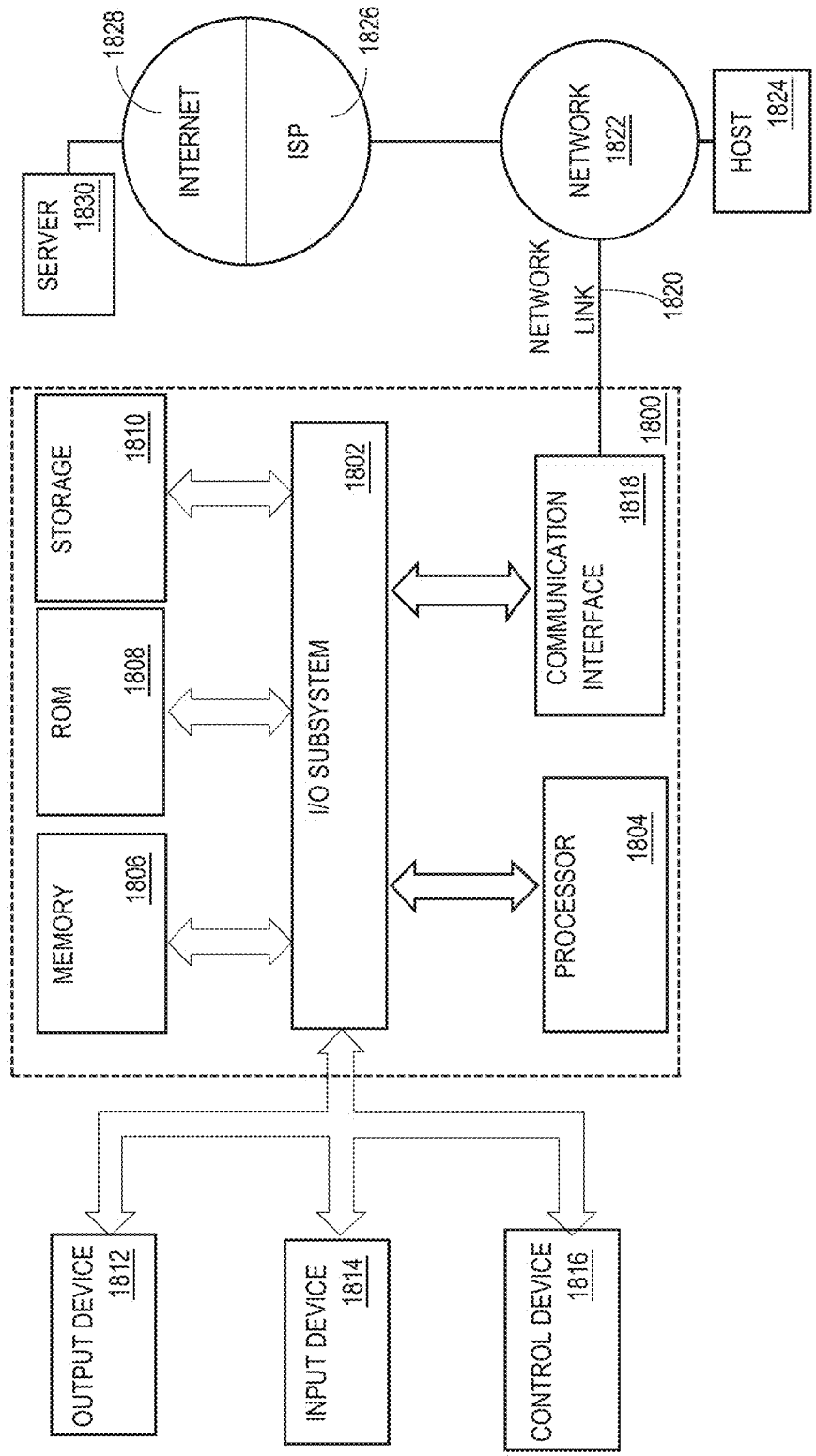
FIG. 18 is a block diagram that illustrates a computer system upon which an embodiment may be implemented.

For example, FIG. 18 is a block diagram that illustrates a computer system 1800 upon which an embodiment may be implemented. Computer system 1800 includes a bus 1802 or other communication mechanism for communicating information, and a hardware processor 1804 coupled with bus 1802 for processing information. Hardware processor 1804 may be, for example, a general-purpose microprocessor.

Computer system 1800 also includes a main memory 1806, such as a random access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk, optical disk, or solid-state drive is provided and coupled to bus 1802 for storing information and instructions.

Computer system 1800 may be coupled via bus 1802 to a display 1812, such as a cathode ray tube (CRT), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1810. Volatile media includes dynamic memory, such as main memory 1806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid-state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN. Wireless links may also be implemented. In any such implementation, communication interface 1818 sends and receives electrical, electromagnetic, or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the worldwide packet data communication network now commonly referred to as the "Internet" 1828. Local network 1822 and Internet 1828 both use electrical, electromagnetic, or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-executed method comprising:
    based on an input image, performing a multi-phase operation to produce an output image that is both stylized and textured;
    wherein performing the multi-phase operation includes performing a texture-applying phase and performing a style-applying phase;
    wherein performing the texture-applying phase includes generating texture for the output image using a first trained machine learning model; and
    wherein performing the style-applying phase includes generating styling for the output image, based on a style input image, using a second trained machine learning model.

2. The computer-executed method of claim 1 further comprising:
    using a training dataset, training a machine learning model to produce the first trained machine learning model; and
    wherein the training dataset comprises one or more pairs of images, wherein each pair of images, of the one or more pairs of images, comprises an input image that visually defines a plurality of distinct image areas and a target image that depicts a texturized version of each distinct image area of the plurality of distinct image areas.

3. The computer-executed method of claim 1 wherein the input image includes a particular plurality of distinct image areas and performing the texture-applying phase includes using the first trained machine learning model to infer a textured output image that depicts an automatically-generated texture for each distinct image area of the particular plurality of distinct image areas.

4. The computer-executed method of claim 3 wherein performing the style-applying phase includes, based on (a) the textured output image produced during the texture-applying phase of the multiple-phase operation and (b) the style input image, using the second trained machine learning model to perform neural style transfer to infer a styled texturized output image that incorporates content of the textured output image and reflects one or more style aspects of the style input image.

5. The computer-executed method of claim 4, further comprising modifying the styled texturized output image by combining the styled texturized output image with the textured output image to produce a modified styled output image.

6. The computer-executed method of claim 5, wherein combining the styled texturized output image with the textured output image to produce the modified styled output image comprises:
    adjusting an opacity of one of (a) the styled texturized output image and (b) the textured output image to produce an opacity-adjusted image; and
    wherein combining the styled texturized output image with the textured output image to produce the modified styled output image is based on the opacity-adjusted image.

7. The computer-executed method of claim 1, wherein:
    the input image visually defines a particular plurality of distinct image areas based on a corresponding plurality of color blocks; and neighboring color blocks, of the plurality of color blocks, are different colors.

8. The computer-executed method of claim 1, wherein:
the style input image is a first style input image;
based on the first style input image, the second trained machine learning model produces a styled texturized output image; and
the method further comprises, during the style-applying phase of the multiple-phase operation:
based on (a) a textured output image produced during the texture-applying phase of the multiple-phase operation and (b) one or more additional style input images other than the first style input image, using the second trained machine learning model to infer one or more additional styled texturized output images;
wherein each additional styled texturized output image, of the one or more additional styled texturized output images, incorporates content of the textured output image and reflects one or more style aspects of a respective additional style input image of the one or more additional style input images.

9. The computer-executed method of claim 1, wherein:
performing the multi-phase operation is in response to a request; and
the request to identifies the style input image.

10. One or more non-transitory computer-readable media storing instructions which, when executed by one or more computing devices, cause:
based on an input image, performing a multi-phase operation to produce an output image that is both stylized and textured;
wherein performing the multi-phase operation includes performing a texture-applying phase and performing a style-applying phase;
wherein performing the texture-applying phase includes generating texture for the output image using a first trained machine learning model; and
wherein performing the style-applying phase includes generating styling for the output image, based on a style input image, using a second trained machine learning model.

11. The one or more non-transitory computer-readable media of claim 10 further comprising instructions for:
using a training dataset, training a machine learning model to produce the first trained machine learning model; and
wherein the training dataset comprises one or more pairs of images, wherein each pair of images, of the one or more pairs of images, comprises an input image that visually defines a plurality of distinct image areas and a target image that depicts a texturized version of each distinct image area of the plurality of distinct image areas.

12. The one or more non-transitory computer-readable media of claim 10 wherein the input image includes a particular plurality of distinct image areas and performing the texture-applying phase includes using the first trained machine learning model to infer a textured output image that depicts an automatically-generated texture for each distinct image area of the particular plurality of distinct image areas.

13. The one or more non-transitory computer-readable media of claim 12 wherein performing the style-applying phase includes, based on (a) the textured output image produced during the texture-applying phase of the multiple-phase operation and (b) the style input image, using the second trained machine learning model to perform neural style transfer to infer a styled texturized output image that incorporates content of the textured output image and reflects one or more style aspects of the style input image.

14. The one or more non-transitory computer-readable media of claim 13, further comprising instructions for modifying the styled texturized output image by combining the styled texturized output image with the textured output image to produce a modified styled output image.

15. The one or more non-transitory computer-readable media of claim 14, wherein combining the styled texturized output image with the textured output image to produce the modified styled output image comprises:
adjusting an opacity of one of (a) the styled texturized output image and (b) the textured output image to produce an opacity-adjusted image; and
wherein combining the styled texturized output image with the textured output image to produce the modified styled output image is based on the opacity-adjusted image.

16. The one or more non-transitory computer-readable media of claim 10, wherein:
the input image visually defines a particular plurality of distinct image areas based on a corresponding plurality of color blocks; and
neighboring color blocks, of the plurality of color blocks, are different colors.

17. The one or more non-transitory computer-readable media of claim 10, wherein:
the style input image is a first style input image;
based on the first style input image, the second trained machine learning model produces a styled texturized output image; and
the instructions include instructions for, during the style-applying phase of the multiple-phase operation:
based on (a) a textured output image produced during the texture-applying phase of the multiple-phase operation and (b) one or more additional style input images other than the first style input image, using the second trained machine learning model to infer one or more additional styled texturized output images;
wherein each additional styled texturized output image, of the one or more additional styled texturized output images, incorporates content of the textured output image and reflects one or more style aspects of a respective additional style input image of the one or more additional style input images.

18. The one or more non-transitory computer-readable media of claim 10, wherein:
performing the multi-phase operation is in response to a request; and
the request to identifies the style input image.

19. A system comprising:
one or more processors; and
one or more non-transitory computer-readable media storing instructions which, when executed by the one or more processors, cause:
based on an input image, performing a multi-phase operation to produce an output image that is both stylized and textured;
wherein performing the multi-phase operation includes performing a texture-applying phase and performing a style-applying phase;
wherein performing the texture-applying phase includes generating texture for the output image using a first trained machine learning model; and wherein performing the style-applying phase includes generating styling for the output image, based on a style input image, using a second trained machine learning model.

20. The system claim 19 wherein the instructions include instructions for:

using a training dataset, training a machine learning model to produce the first trained machine learning model; and wherein the training dataset comprises one or more pairs of images, wherein each pair of images, of the one or more pairs of images, comprises an input image that visually defines a plurality of distinct image areas and a target image that depicts a texturized version of each distinct image area of the plurality of distinct image areas.

* * * * *